(12) United States Patent
Hamada et al.

(10) Patent No.: US 6,226,459 B1
(45) Date of Patent: May 1, 2001

(54) APPARATUS HAVING A DRIVEN MEMBER AND A DRIVE CONTROLLER THEREFOR

(75) Inventors: Masataka Hamada, Osakasayama; Kazuhiko Yukawa, Sakai; Kohtaro Hayashi, Toyonaka; Tetsuro Kanbara, Sakai, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/577,624

(22) Filed: May 25, 2000

Related U.S. Application Data

(62) Division of application No. 09/119,005, filed on Jul. 20, 1998, now Pat. No. 6,085,039, which is a division of application No. 08/872,396, filed on Jun. 10, 1997, now Pat. No. 5,815,742.

(30) Foreign Application Priority Data

| Jun. 11, 1996 | (JP) | ................................... 8-149536 |
| Jun. 11, 1996 | (JP) | ................................... 8-149539 |
| Jun. 19, 1996 | (JP) | ................................... 8-149541 |

(51) Int. Cl.$^7$ ..................................... G03B 17/00
(52) U.S. Cl. ................................................. 396/54
(58) Field of Search ............................... 396/55, 52, 382, 396/373; 348/208

(56) References Cited

U.S. PATENT DOCUMENTS

| Re. 31,362 | 8/1983 | Shenk ................................. 352/140 |
| 4,218,119 | 8/1980 | Schickedanz ........................ 396/100 |
| 4,474,442 | 10/1984 | Shiozawa et al. ................... 396/395 |
| 4,488,799 | 12/1984 | Suzuki et al. ....................... 396/119 |
| 4,517,501 | 5/1985 | Takimoto ............................. 388/813 |
| 4,527,053 | 7/1985 | Kinoshita et al. ................. 250/201.2 |
| 4,563,705 | 1/1986 | Oinue et al. ........................ 348/350 |
| 4,918,479 | 4/1990 | Inoue et al. ........................... 396/90 |
| 5,302,997 | 4/1994 | Cocca ................................... 396/99 |
| 5,365,304 | 11/1994 | Hamada et al. ....................... 396/54 |
| 5,389,997 | 2/1995 | Ohishi .................................. 396/53 |
| 5,428,420 | 6/1995 | Akashi et al. ....................... 396/111 |
| 5,771,411 | 6/1998 | Iwasaki ................................ 396/96 |
| 5,778,261 | * 7/1998 | Tanaka et al. ....................... 396/55 |
| 5,937,214 | * 8/1999 | Shintani et al. ..................... 396/55 |

FOREIGN PATENT DOCUMENTS

| 7-333671 | 12/1995 | (JP) . |
| 8-087047 | 4/1996 | (JP) . |

* cited by examiner

*Primary Examiner*—W. B. Perkey
(74) *Attorney, Agent, or Firm*—Burns, Doane, Swecker & Mathis, LLP

(57) ABSTRACT

An apparatus has a member to be driven, an actuator for driving the member, a position detector and a controller. The actuator drives the member to move by an amount proportional to a given number of pulses. The position detector detects a position of the member in predetermined detection steps. The controller determines in steps smaller than the predetermined detection steps a target position up to which the member is to be moved. Then, it controls the actuator up to a detection-step position before the target position by closed-loop control in accordance with a detection result from the detector. Further, it controls the actuator from the detection step position to the target position by open-loop control.

12 Claims, 28 Drawing Sheets

FIG. 34

| INCLINATION \ DIRECTION | FORWARD | BACKWARD |
|---|---|---|
| UPWARD | 0.5 | 0.6 |
| LEVEL | 1.0 | 1.1 |
| DOWNWARD | 1.5 | 1.6 |

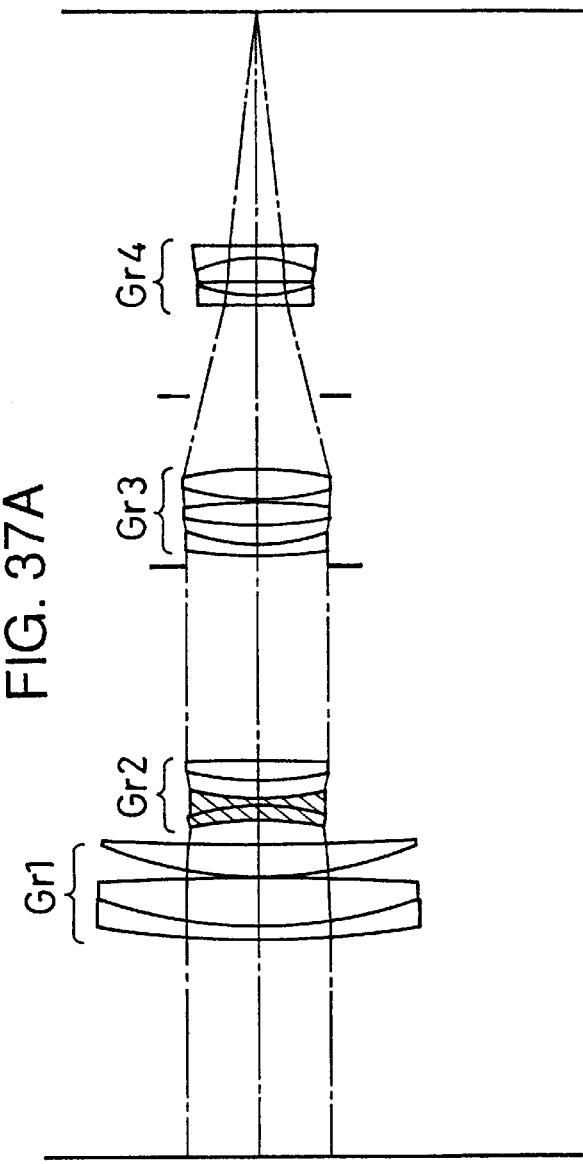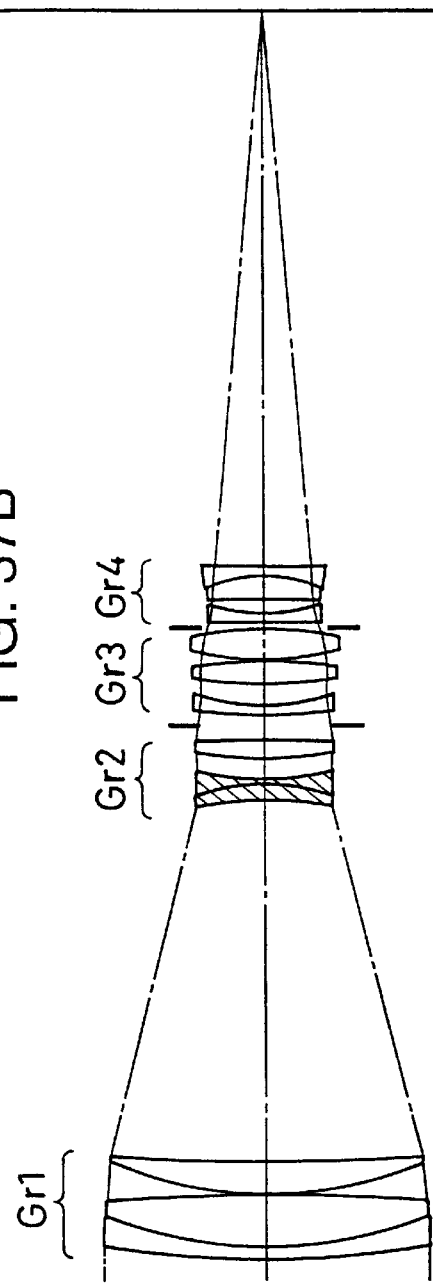

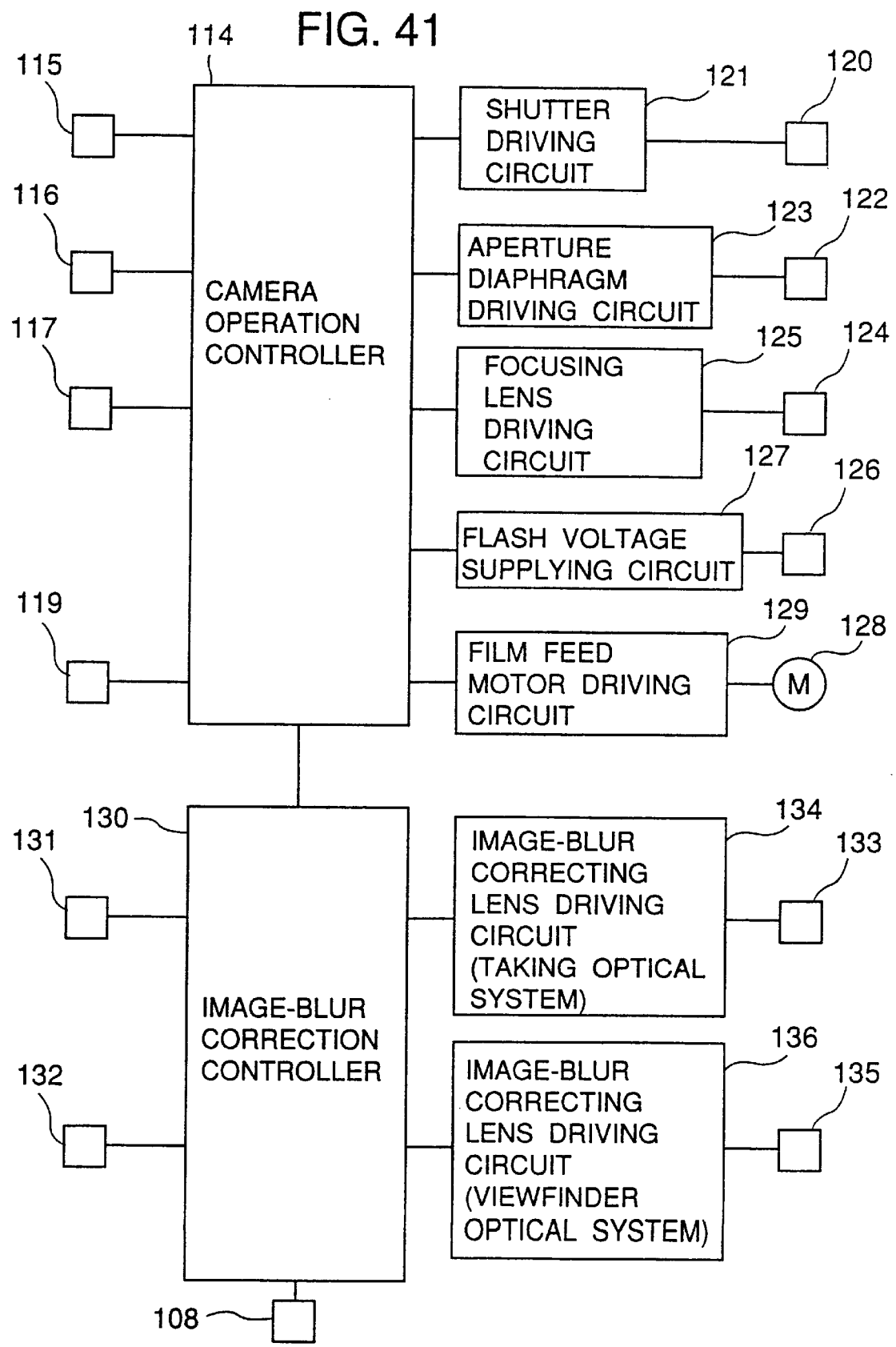

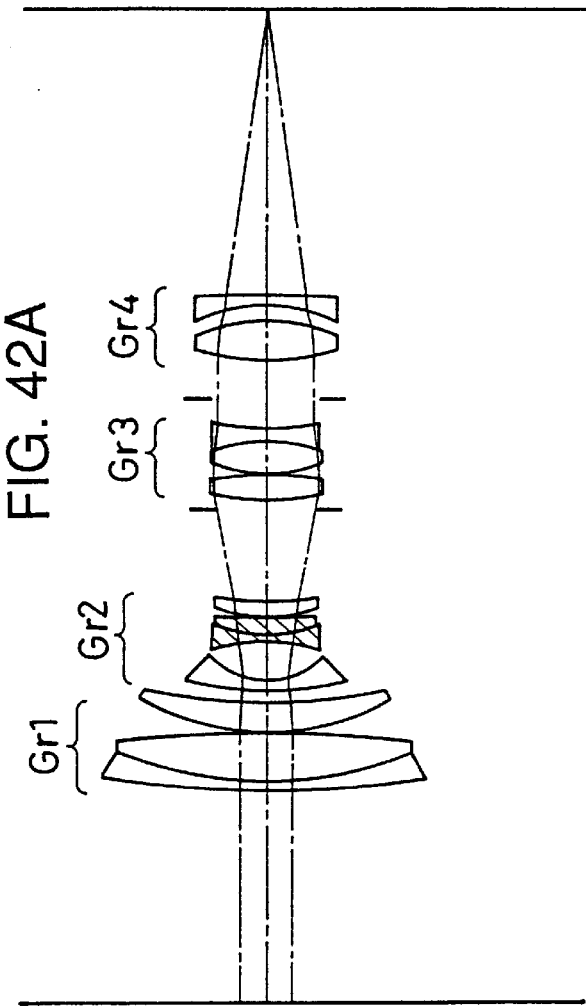
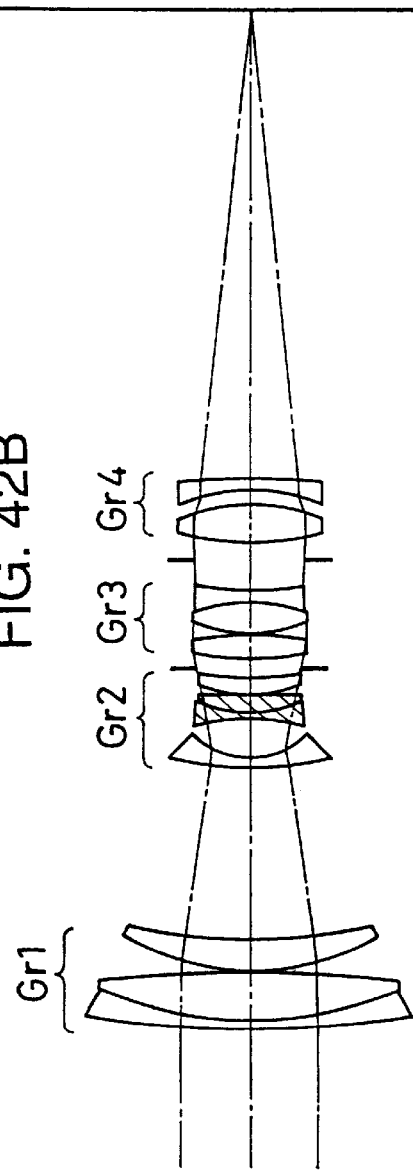
FIG. 42A
FIG. 42B

APPARATUS HAVING A DRIVEN MEMBER AND A DRIVE CONTROLLER THEREFOR

This application is a divisional of application No. 09/119,005, filed Jul. 20, 1998, now U.S. Pat. No. 6,085,039 which is a divisional of application No. 08/872,396 filed on Jun. 10, 1997 now U.S. Pat. No. 5,815,742.

BACKGROUND OF THE INVENTION

1. Field of the Invention

The present invention relates to an apparatus having a driven member and a drive controller therefor such as a camera having an image-blur correcting function.

2. Description of the Prior Art

To prevent unsuccessful photographing due to hand shakes, cameras having an image-blur correcting function have been developed. Today, many cameras come equipped with a zoom lens with an increasingly high magnification as their standard lens, and, as a result, photographing with long focal lengths is now considerably easy. However, this inevitably makes the effect of hand shakes felt more strongly than ever before, and therefore image-blur correction is a desirable function in cameras today; in fact, in movie video cameras, it is indispensable.

Conventionally, image-blur correction in a camera is achieved as follows. The light from an object is directed into an image-blur detecting optical system, where the light is passed through an imaging lens and is then received by an image-blur detecting sensor that is realized with a photoelectric conversion device such as CCD (charge-coupled device). When a hand shake occurs, this sensor detects the resulting image blur. Then, in accordance with the amount and direction of the detected image blur, an image-blur correcting lens unit driving system drives an image-blur correcting lens unit to be decentered in a direction perpendicular to the optical axis of the taking optical system in such a way that the image blur is canceled out. As a result, the image of the object is kept in the same position on the film throughout exposure.

However, to achieve image-blur correction as described above, a camera needs to be equipped with an image-blur detecting optical system and an image-blur detecting sensor, both of which require extra space inside the camera. This is inconvenient especially in compact cameras, because providing them with an image-blur correcting function results in making them larger and heavier, quite contrary to what is expected of such cameras.

SUMMARY OF THE INVENTION

An object of the present invention is to provide an apparatus having a driven member whose position can be controlled with high accuracy.

Another object of the present invention is to provide a compact and lightweight camera having an image-blur correcting function that can be realized without securing unduly large space for it inside the camera.

To achieve the first object, according to one aspect of the present invention, an apparatus is provided with a member to be driven; an actuator that in response to a pulse signal drives said to-be-driven member to move by an amount proportional to a given number of pulses; a position detector that detects the position of said to-be-driven member in predetermined detection steps; and a controller that determines in steps smaller than said predetermined detection steps a target position up to which said to-be-driven member is to be moved, controls said actuator up to a detection-step position immediately before the target position by closed-loop control in accordance with a detection result from said detector, and controls said actuator from that detection-step position to the target position by open-loop control.

To achieve the second object, according to another aspect of the present invention, in a camera having an image-blur correcting function, an optical system is provided with an apparatus as noted above.

BRIEF DESCRIPTION OF THE DRAWINGS

This and other objects and features of this invention will become clear from the following description, taken in conjunction with the preferred embodiments with reference to the accompanied drawings in which.

Figure 14:
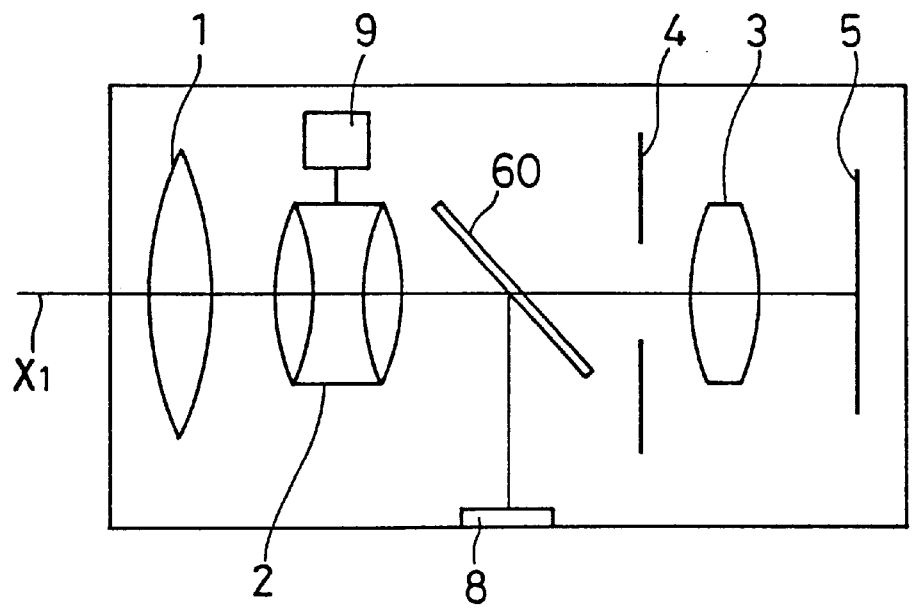
Figure 15:
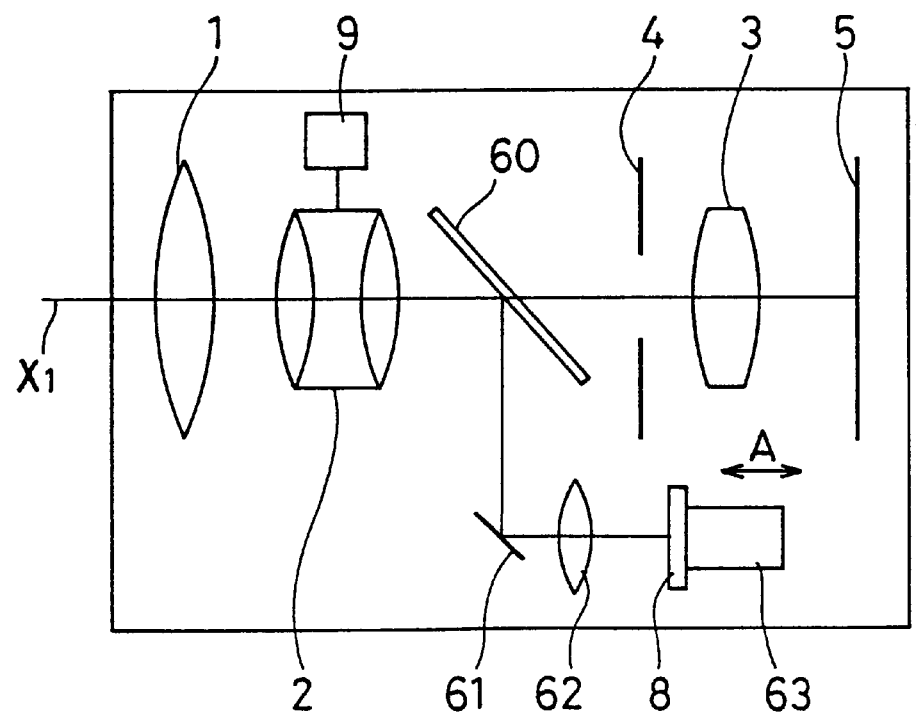
Figure 16:
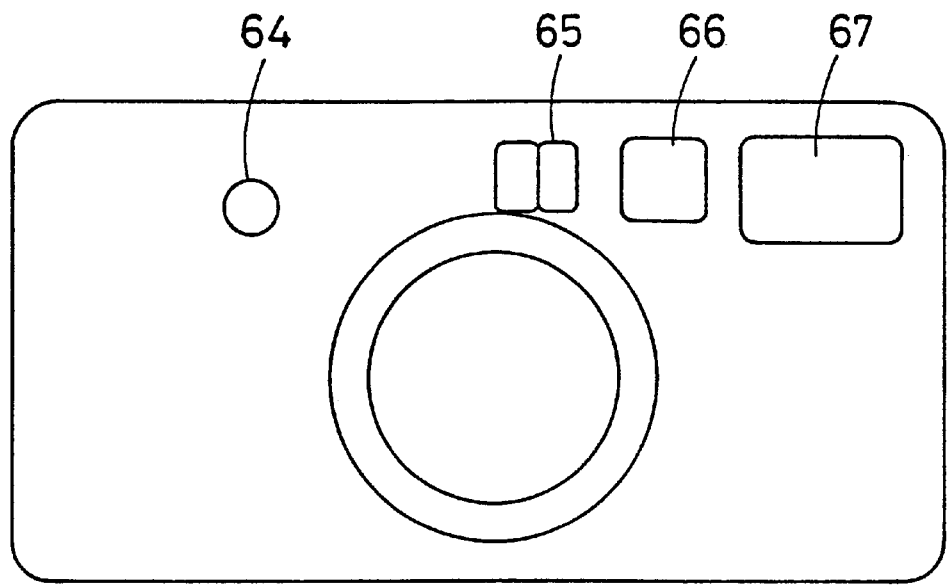
Figure 17:
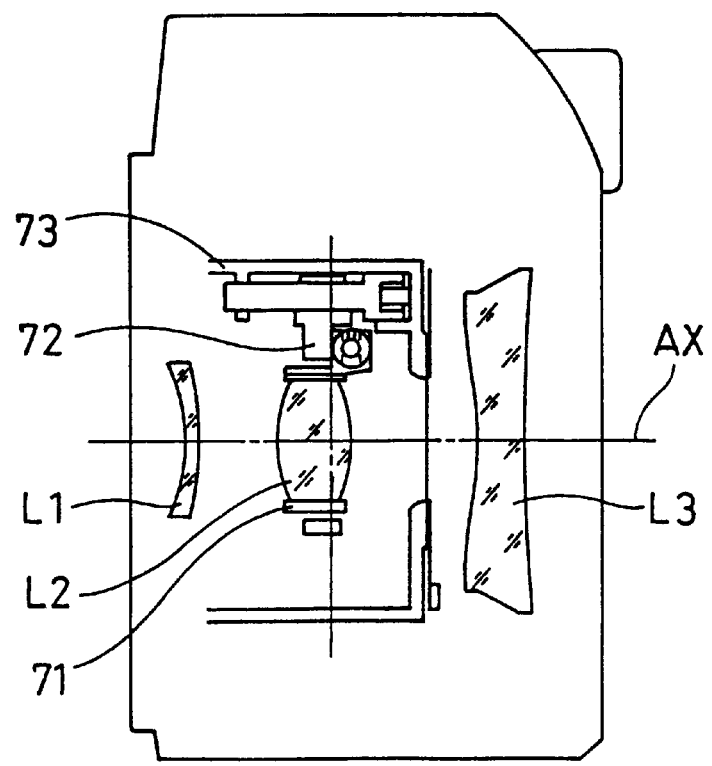
Figure 18A:
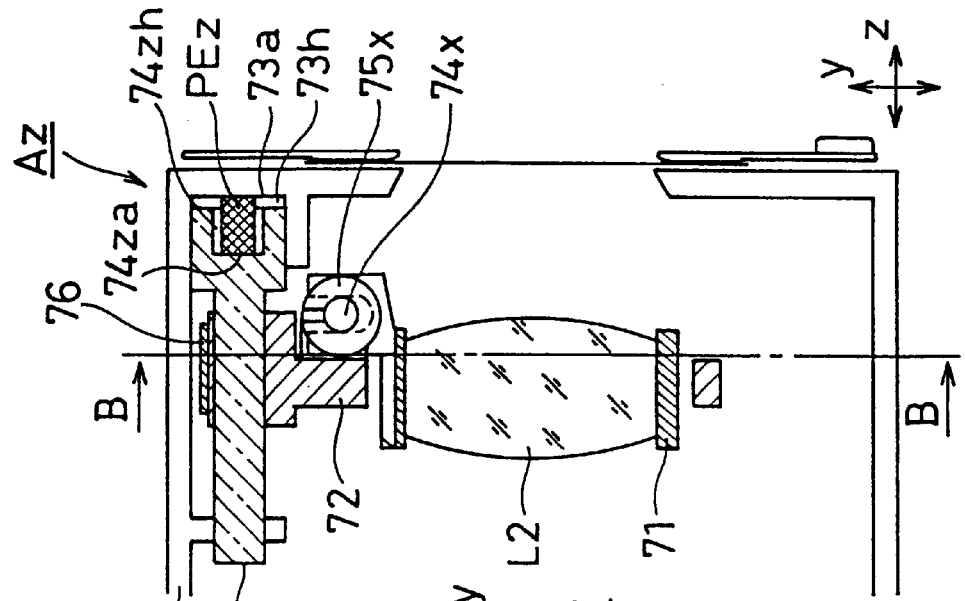
Figure 18B:
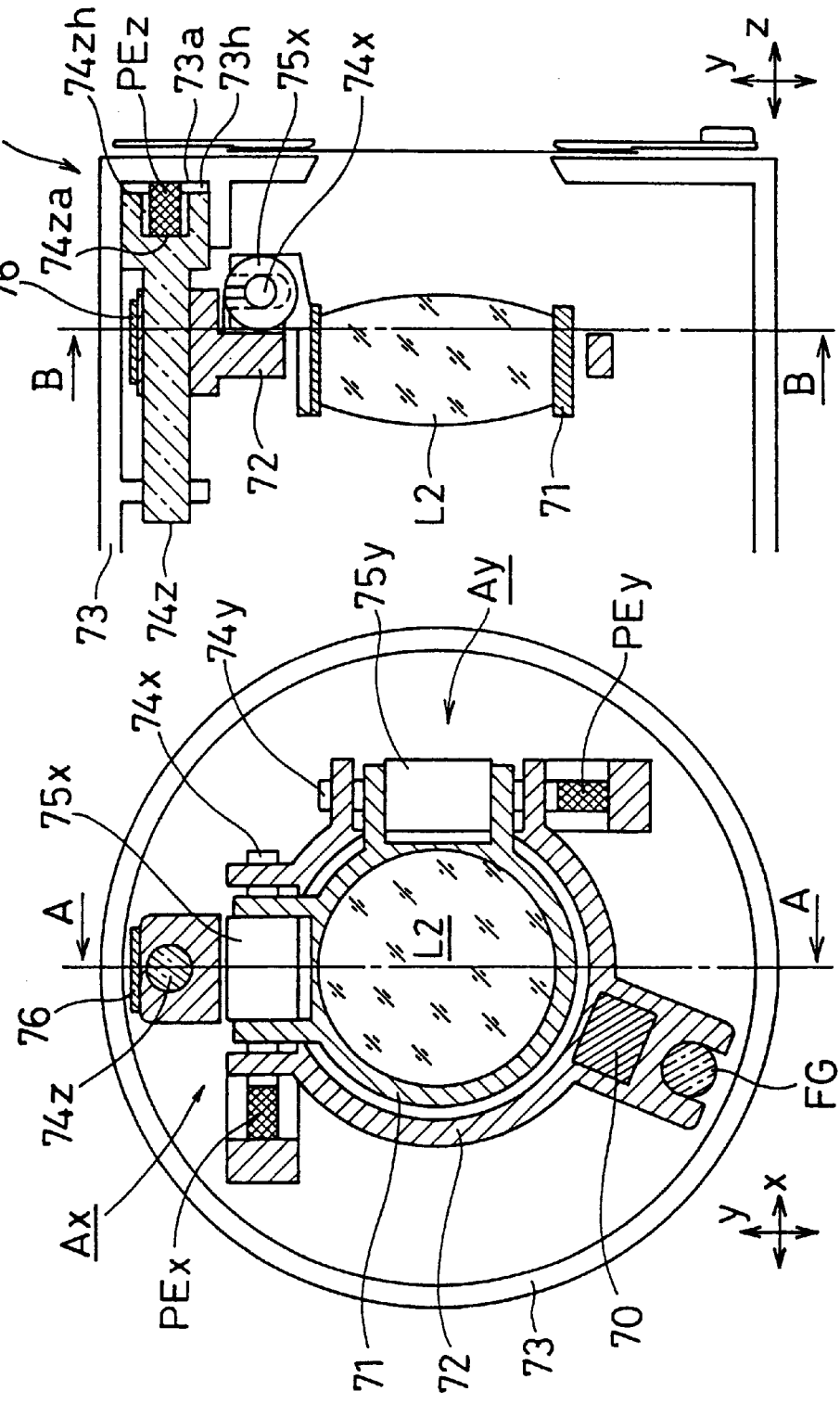
Figure 19A:
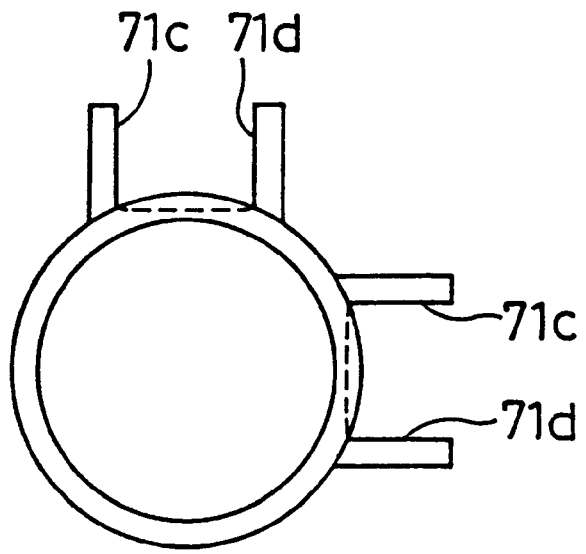
Figure 19B:
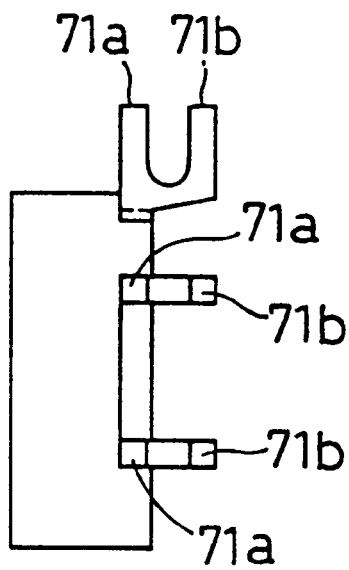
Figure 20:
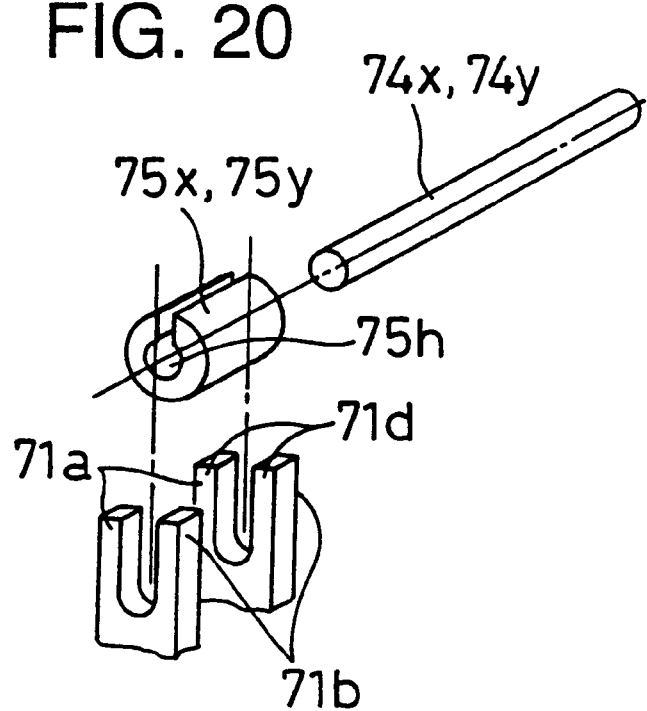
Figure 21A:
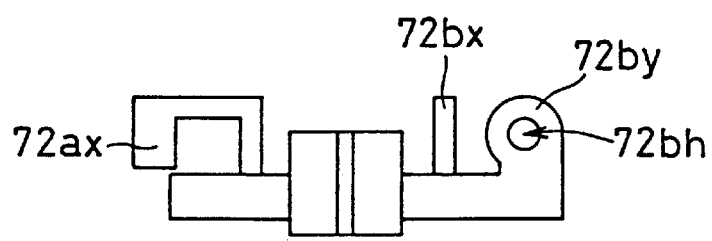
Figure 21B:
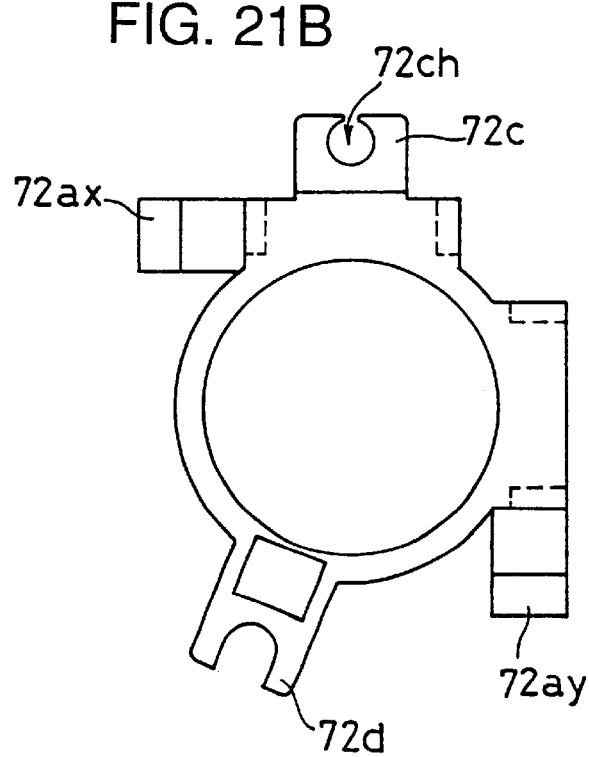
Figure 21C:
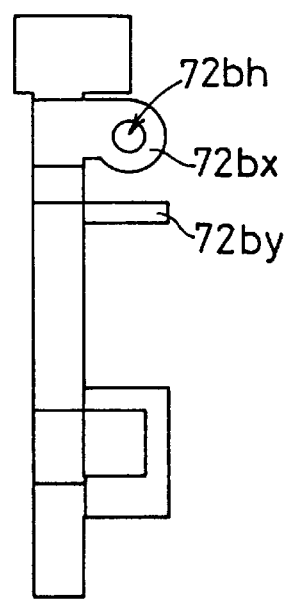
Figure 22:
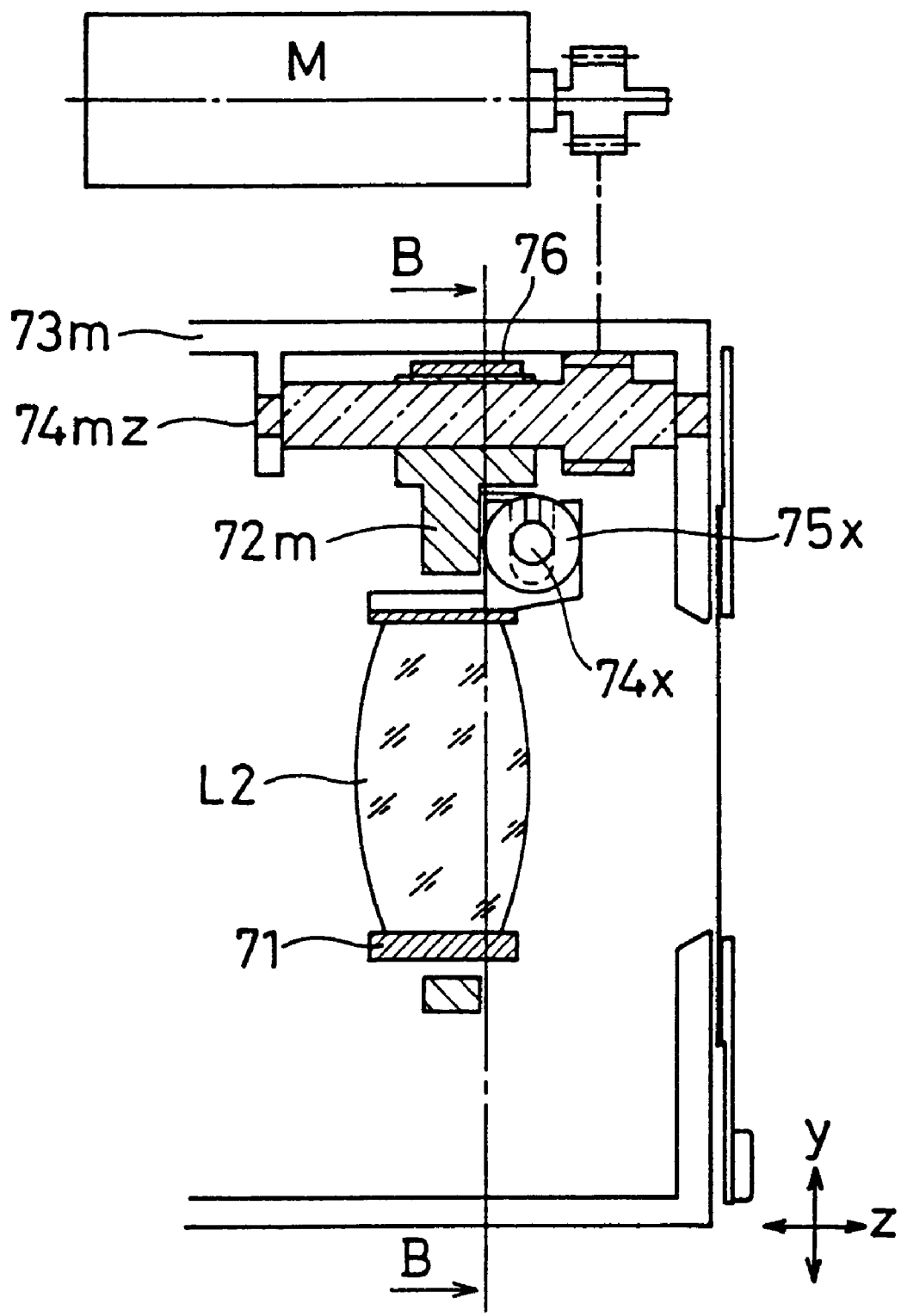
Figure 23:
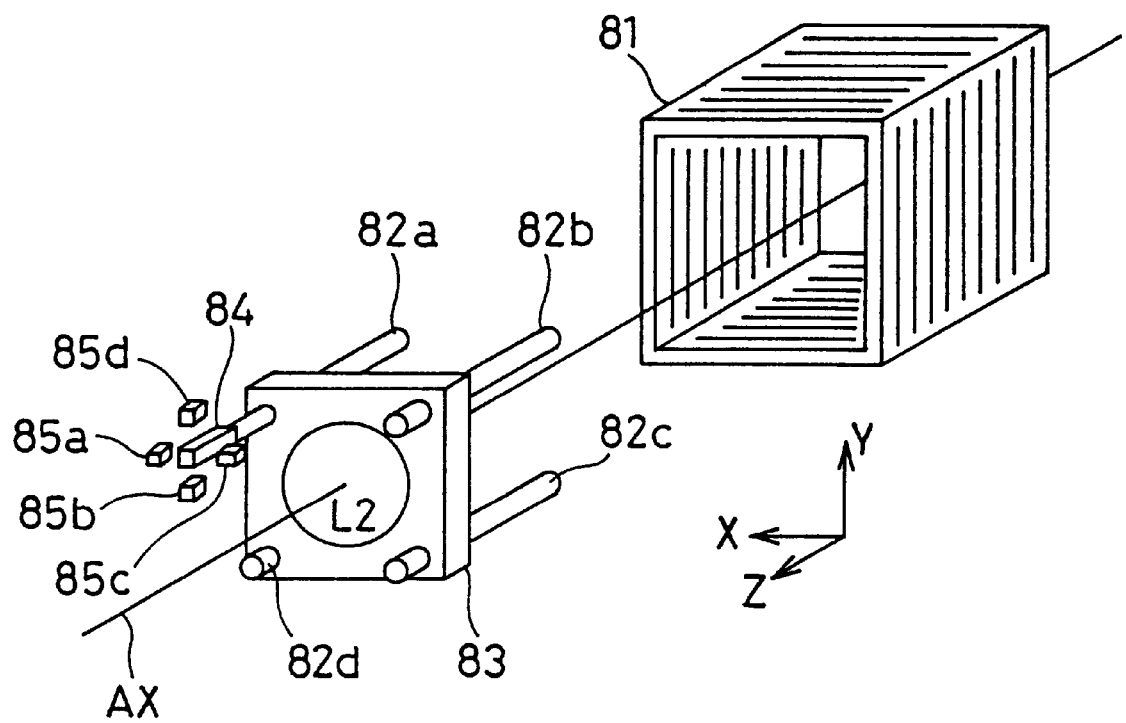
Figure 24:
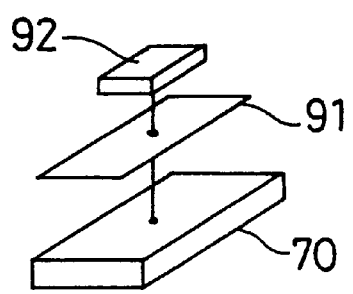
Figure 25:
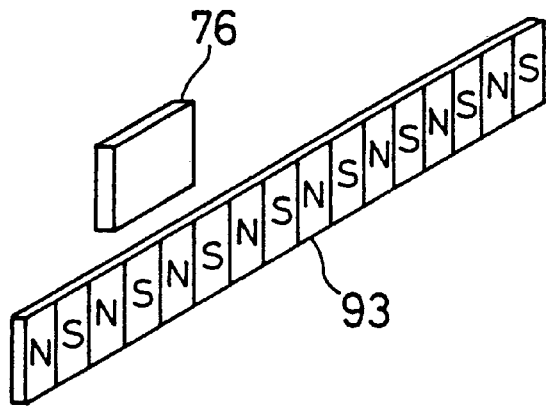
Figure 26:
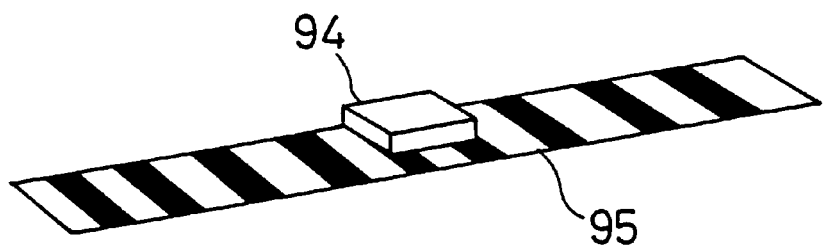
Figure 27:
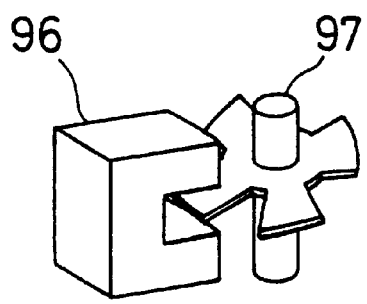
Figure 28:
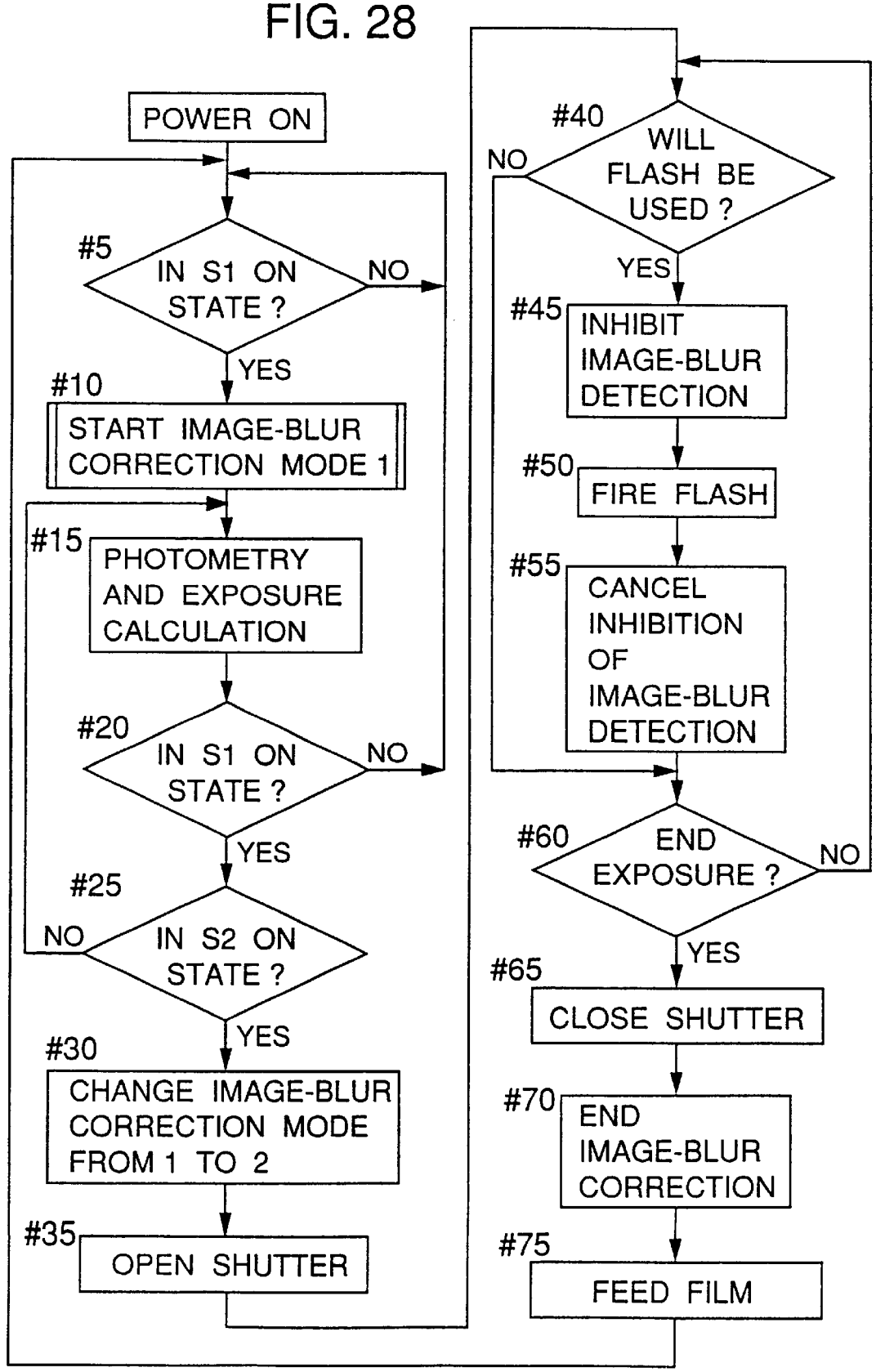
Figure 29:
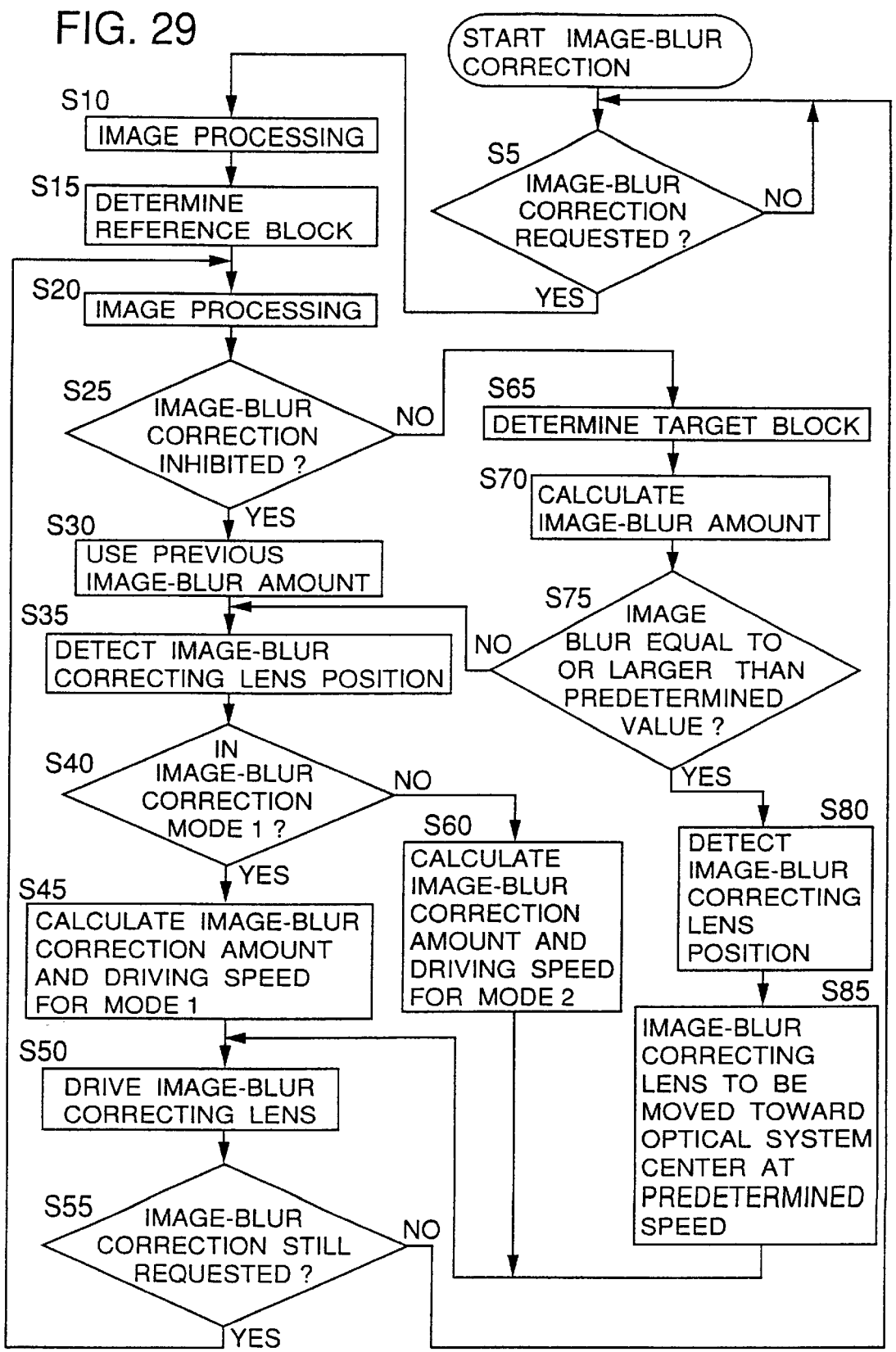
Figure 31:
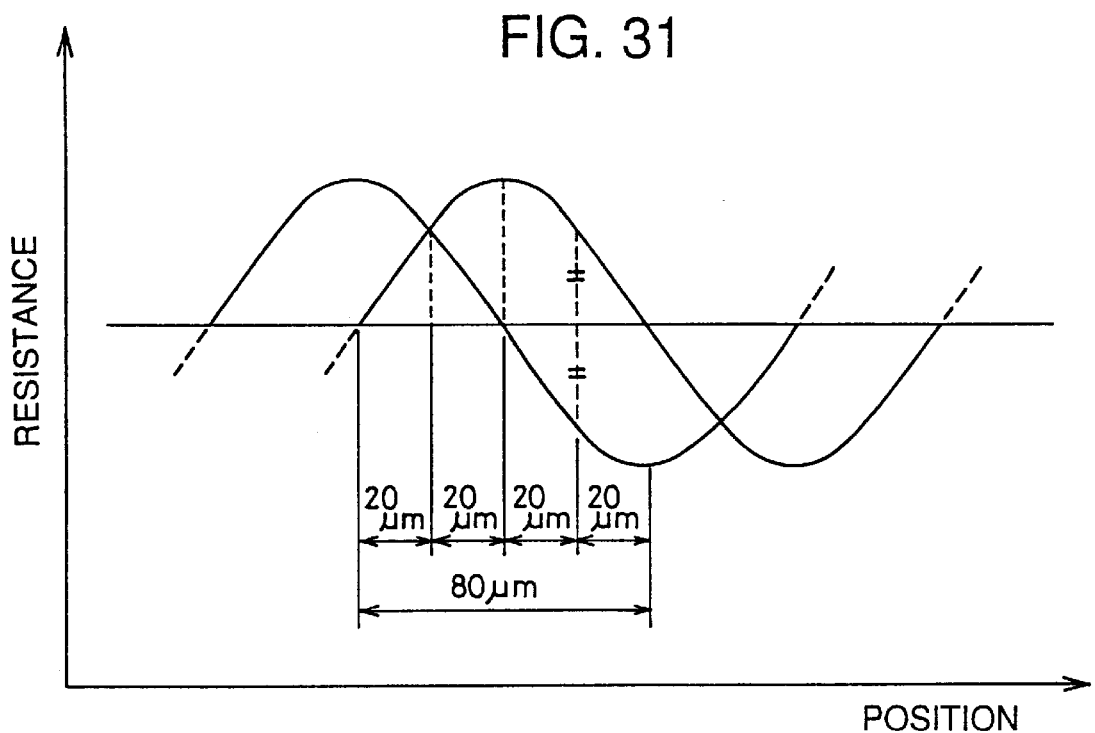
Figure 32:
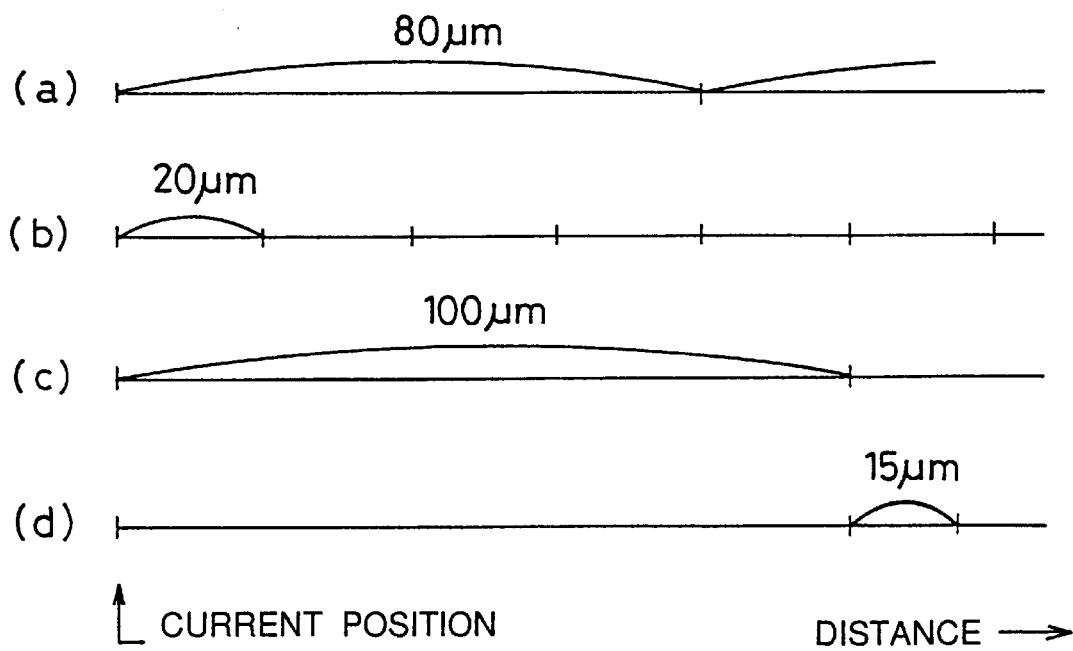
Figure 33:
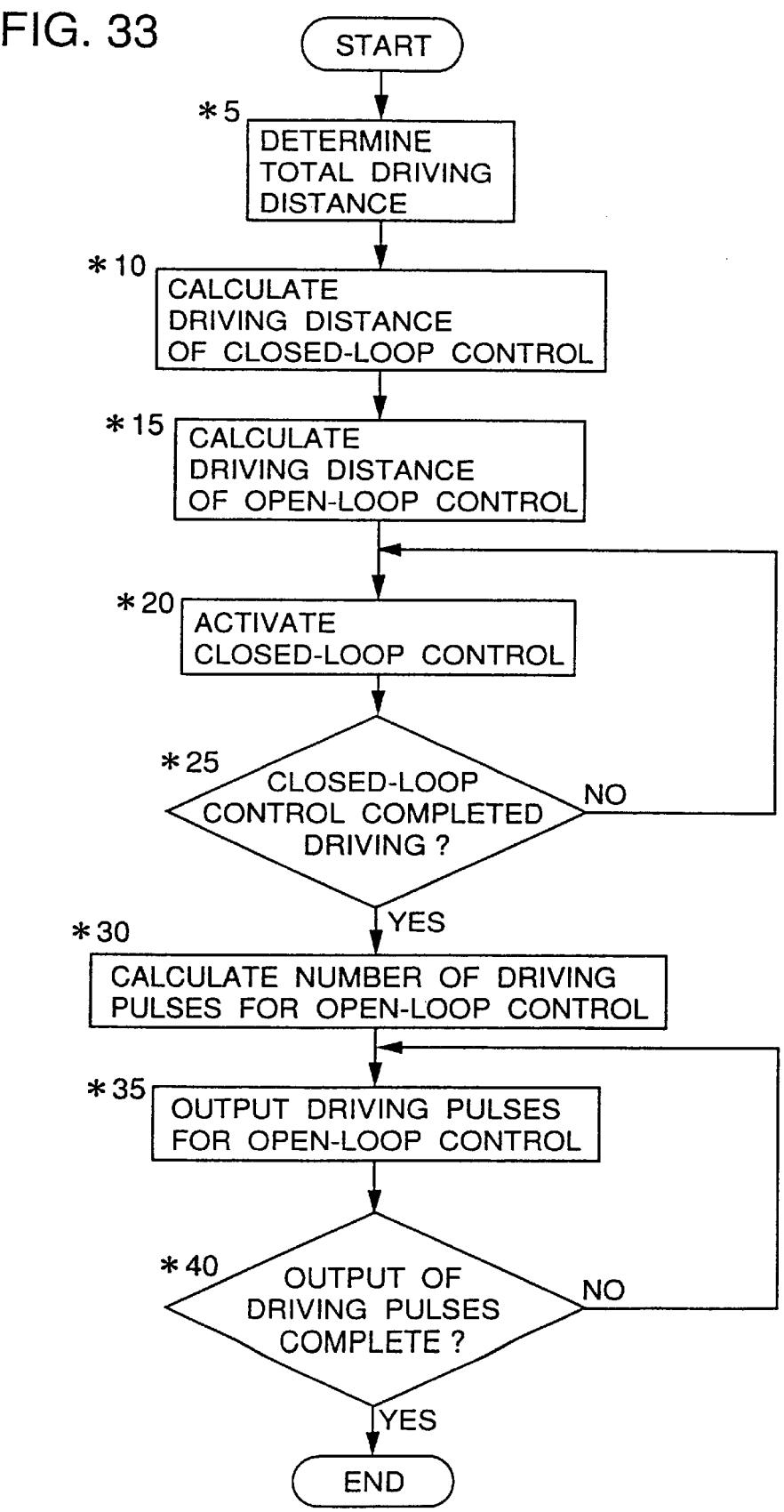
Figure 35:
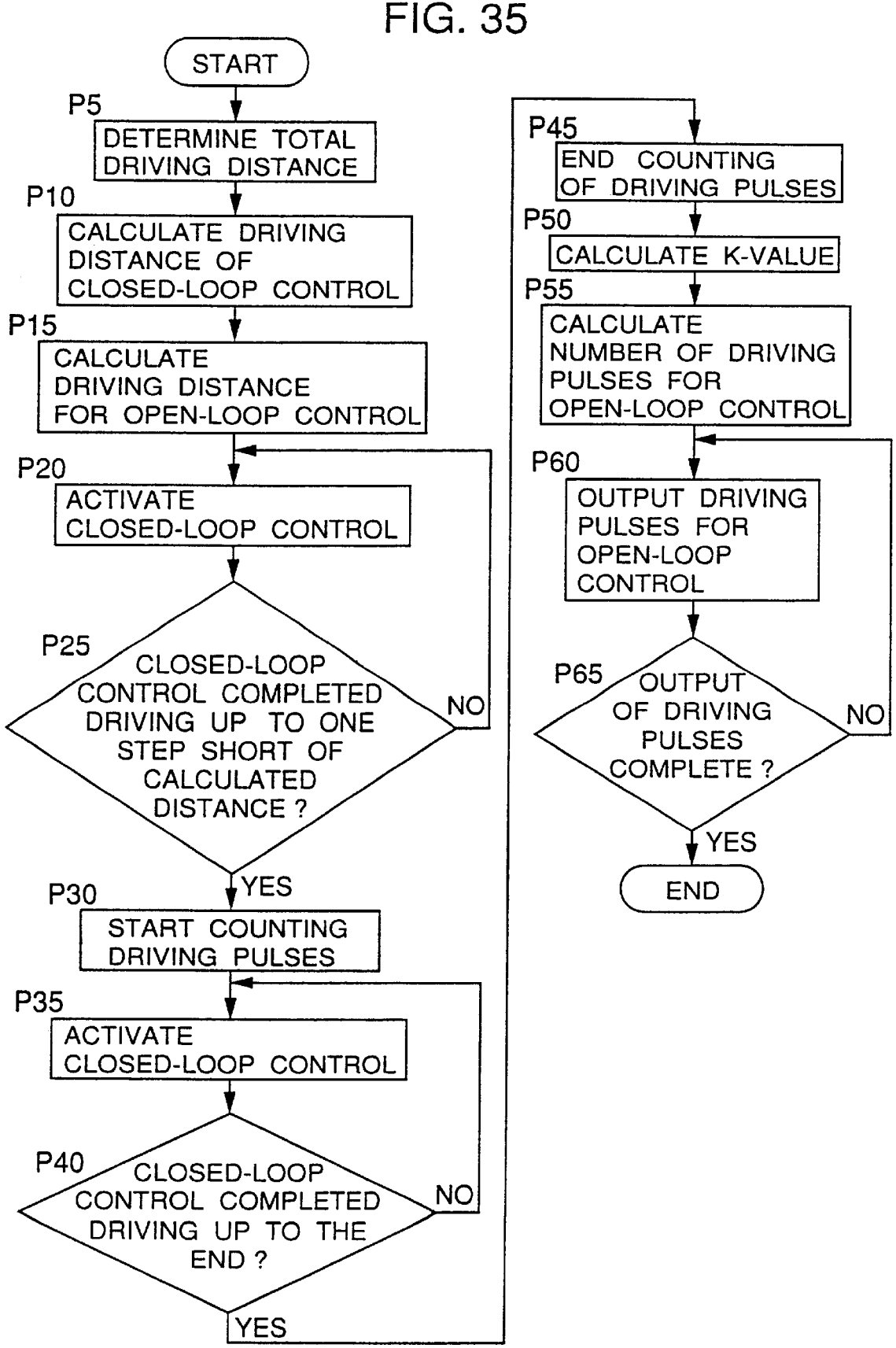
Figure 36:
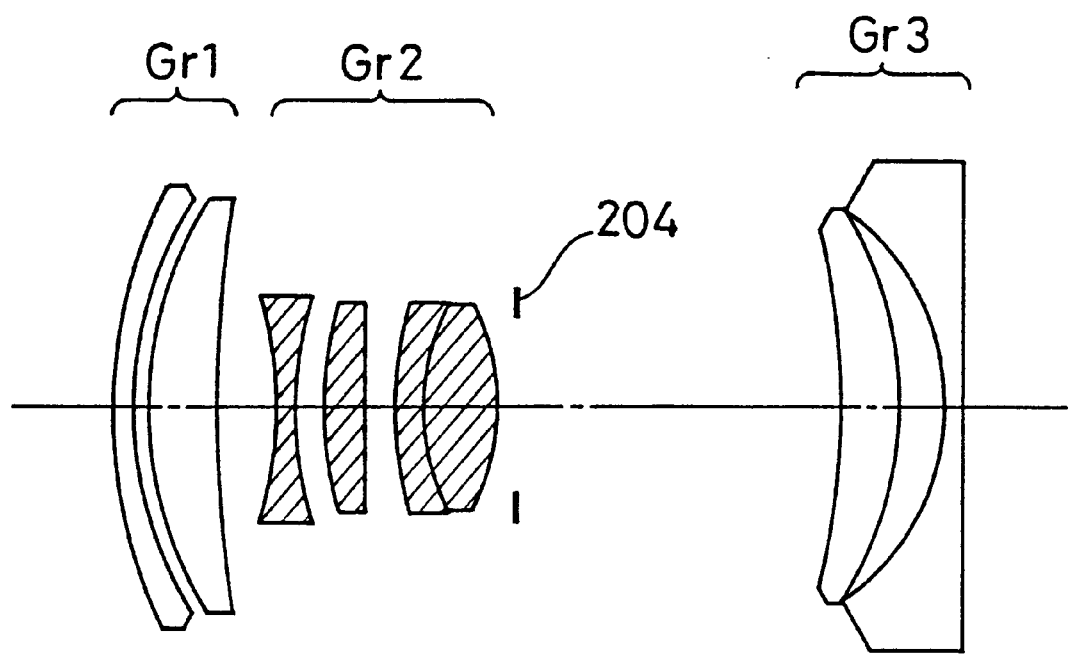
Figure 38:
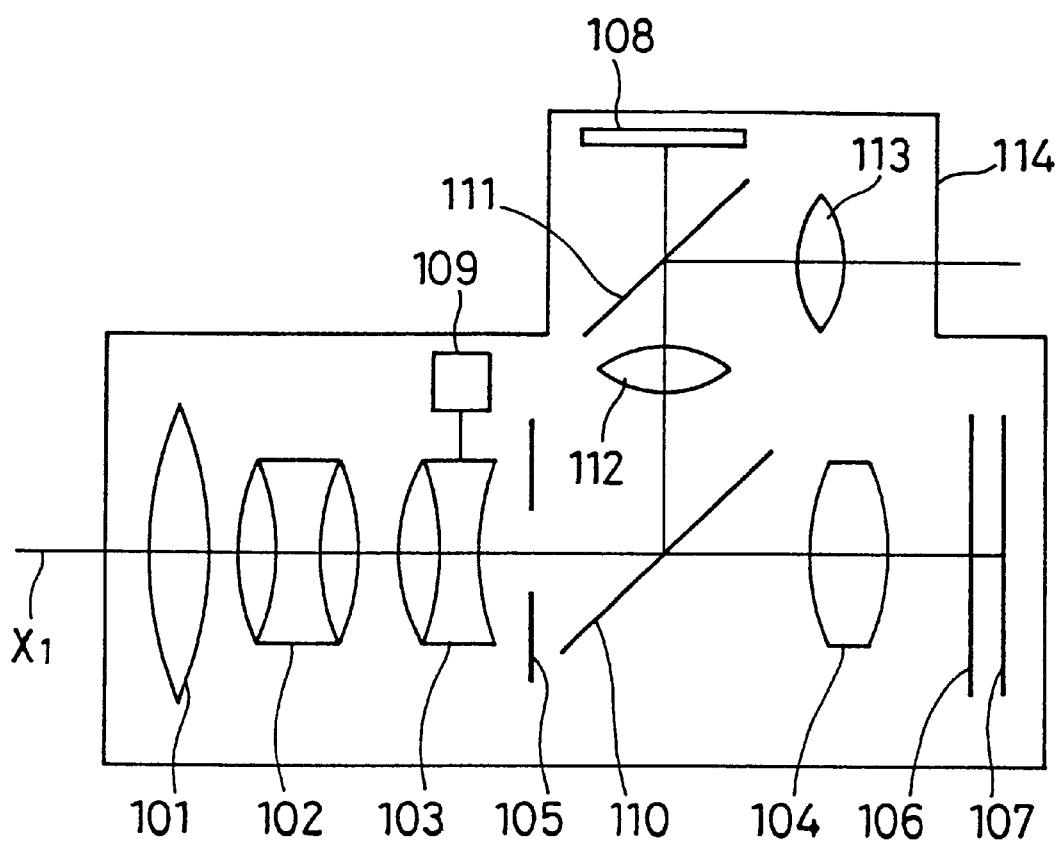
Figure 39:
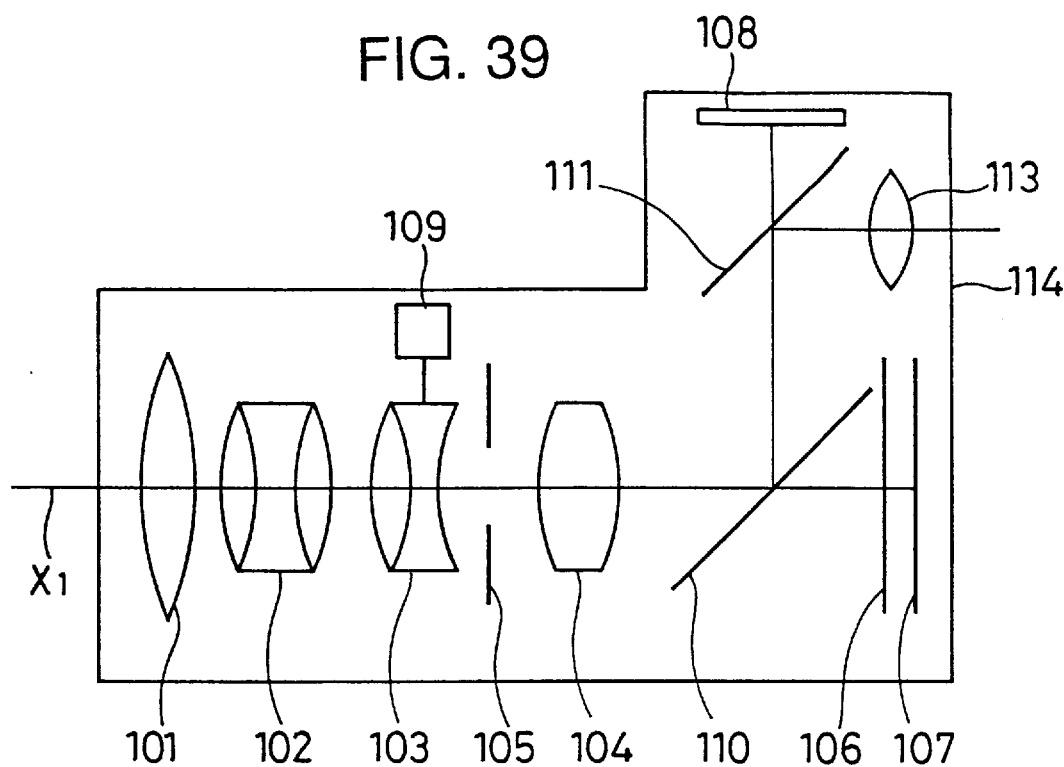
Figure 40:
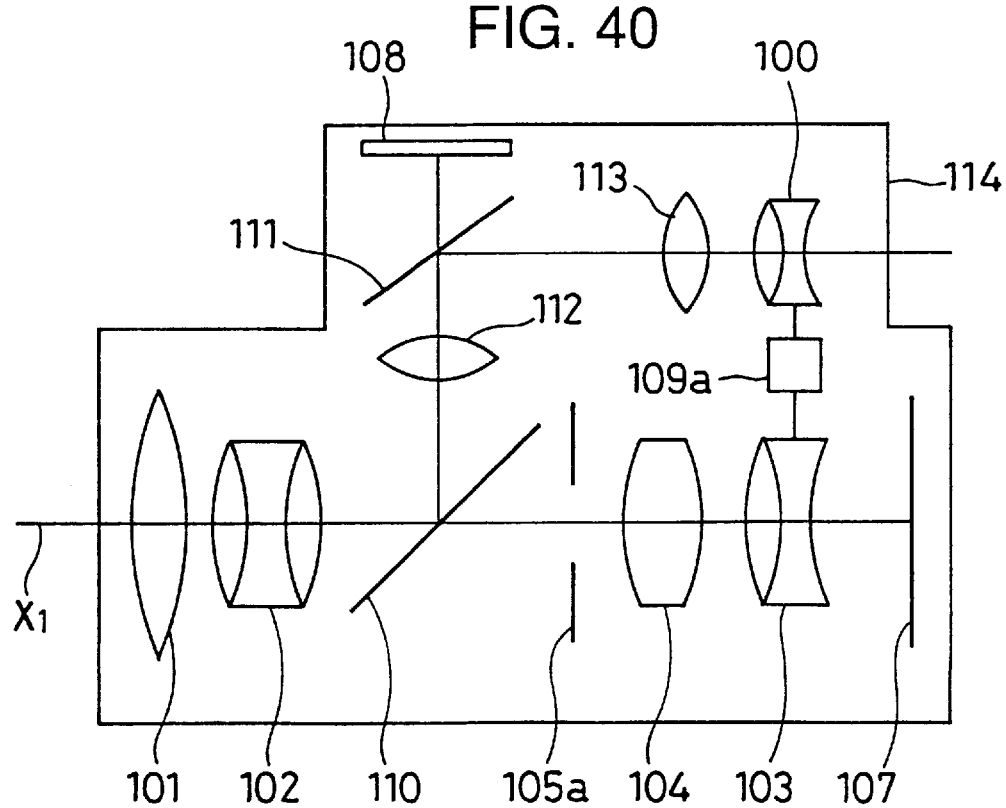

FIG, 14 is a vertical cross-sectional view of the camera of the first embodiment, schematically showing its construction when a TTL-type image-blur detecting optical system is adopted;

FIG. 15 is a diagram showing an example in which the image-blue sensor in FIG. 14 is used also as a distance sensor that uses contrast detecting method;

FIG. 16 is a front view of the camera of the first embodiment, schematically showing its appearance;

FIG. 17 is a side view of the camera of the first embodiment, showing how an image-blur correcting mechanism is incorporated into the camera;

FIGS. 18A and 18B are diagrams showing the construction of the image-blur correcting mechanism incorporated into the camera of the first embodiment;

FIGS. 19A and 19B are front and side views, respectively, of the lens frame;

FIG. 20 is a diagram showing how the slider, rod, and lens frame are assembled together;

FIGS. 21A, 21B, and 21C are top, front, and side views, respectively, of the support frame;

FIG. 22 is a diagram showing an example in which a motor is used to supply mechanical power required to perform focusing;

FIG. 23 is a diagram showing an example in which electromagnets are used to supply mechanical power required to perform image-blur correction;

FIG. 24 is a diagram schematically showing how the two-dimensional PSD in FIG. 18 is used in practice;

FIG. 25 is a diagram schematically showing how the MR sensor in FIG. 18 is used in practice;

FIG. 26 is a diagram schematically showing an example in which a photoreflector is used for position detection;

FIG. 27 is a diagram schematically showing an example in which a photointerruptor is used for position detection;

FIG. 28 is a flowchart showing the shooting procedure;

FIG. 29 is a flowchart showing the image-blur correction procedure;

FIGS. 30A to 30D are diagrams showing the sequence of image-blur detection;

FIG. 31 is a diagram showing the relation between the position of the MR sensor and its resistance;

FIG. 32 is a diagram explaining the method using open-loop control as well as closed-loop control;

FIG. 33 is a flowchart showing the procedure for driving the image-blur correcting lenses;

FIG. 34 is a diagram showing an example of the table of K-values;

FIG. 35 is a flowchart showing the procedure for driving the image-blur correcting lenses by calculating K-values during the closed-loop control;

FIG. 36 is a diagram showing an example of the construction of the taking optical system when the camera of the first embodiment is implemented as a lens shutter camera;

FIGS. 37A and 37B are diagrams showing an example of the construction of the taking optical system when the camera of the first embodiment is implemented as a single-lens reflex camera;

FIG. 38 is a vertical cross-sectional view of a camera having an image-blur correcting function as a second embodiment of the present invention, schematically showing its basic construction;

FIG. 39 is a vertical cross-sectional view of the camera of the second embodiment of the type in which the pellicle mirror is placed immediately in front of the shutter;

FIG. 40 is a vertical cross-sectional view of the camera of the second embodiment of the type in which image-blur correction is performed separately in the taking optical system and in the viewfinder optical system;

FIG. 41 is a diagram showing the construction of the control system used in the camera of the second embodiment; and FIGS. 42A and 42B are diagrams showing an example of the construction of the taking optical system when the camera of the second embodiment is implemented as a single-lens reflex camera.

DESCRIPTION OF THE PREFERRED EMBODIMENTS

Figure 1:
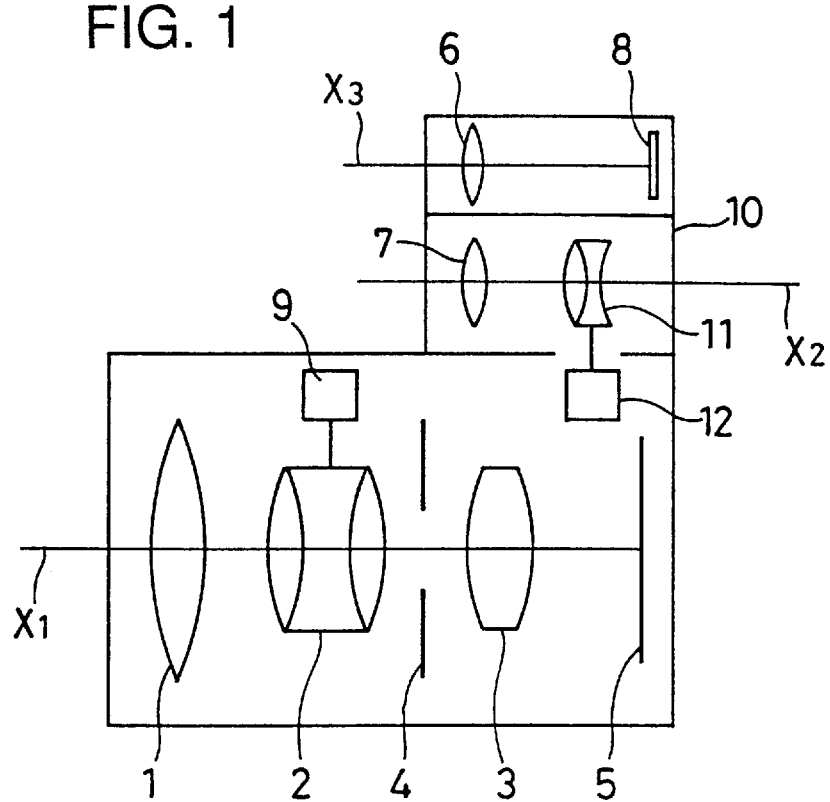
FIG. 1 is a vertical cross-sectional view of a camera having an image-blur correcting function as a first embodiment of the present invention, schematically showing its basic construction.

Hereinafter, embodiments of the present invention will be described with reference to the drawings. FIG. 1 is a vertical cross-sectional view of a camera having an image-blur correcting function as a first embodiment of the present invention, schematically showing its basic construction. As shown in FIG. 1, the camera includes lens units 1, 2, and 3 constituting a taking optical system, an aperture diaphragms/shutter unit 4, a film 5, an imaging lens 6, a viewfinder lens 7, an image-blur sensor 8, an image-blur correcting lens driving system 9 for the taking optical system, a viewfinder 10, an image-blur correcting lens 11 for the viewfinder optical system, and an image-blur correcting lens driving system 12 for the viewfinder optical system. Here, the lens unit 2 is used as an image-blur correcting lens.

During shooting, that is, when a shot is taken by exposing the film 5 to the light from the object, an image blur is corrected as follows. The light from the object enters the image-blur detecting optical system, where the light is passed through the imaging lens 6 and is then received by the image-blur sensor 8 that is realized with a photoelectric conversion device such as a CCD (charge-coupled device). When a hand shake occurs, this sensor 8 detects the resulting image blur. Then, in accordance with the amount and direction of the detected image blur, the image-blur correcting lens driving system 9 drives the image-blur correcting lens 2 to be decentered in a direction perpendicular to the optical axis X1 of the taking optical system in such a way that the image blur is canceled out. As a result, the image of the object is kept in the same position on the film 5 throughout exposure.

During framing, that is, when the object is viewed through the viewfinder 10 in order to set the shooting range and picture composition, an image blur is corrected as follows. The light from the object is directed into the image-blur detecting optical system, where the light is passed through the imaging lens 6 and is then received by the image-blur sensor 8. When a hand shake occurs, this sensor 8 detects the resulting image blur. Then, in accordance with the amount and direction of the detected image blur, the image-blur correcting lens driving system 12 drives the image-blur correcting lens 11 to be decentered in a direction perpendicular to the optical axis X2 of the viewfinder optical system in such a way that the image blur is canceled out.

As a result, even during framing, that is, when the user observes through the viewfinder 10 the light that, emanating from the object, entering the viewfinder optical system, and passing through the viewfinder lens 7, reaches the observer's eyes, it is possible to obtain blur-free viewfinder images, and thus it is possible to confirm the operation of the image-blur correcting function easily. This enhances the camera's user-friendliness.

Usually, image-blur correction is so controlled that only the image-blur correcting lens driving system 12 is operated during framing, and that only the image-blur correcting lens driving system 9 is operated during shooting. This helps reduce the power consumed in image-blur correction. However, it is also possible to operate both of the image-blur correcting lens driving systems 9 and 12 during shooting. This makes confirmation of the operation of the image-blur correcting function possible throughout a shooting session.

Figure 2:
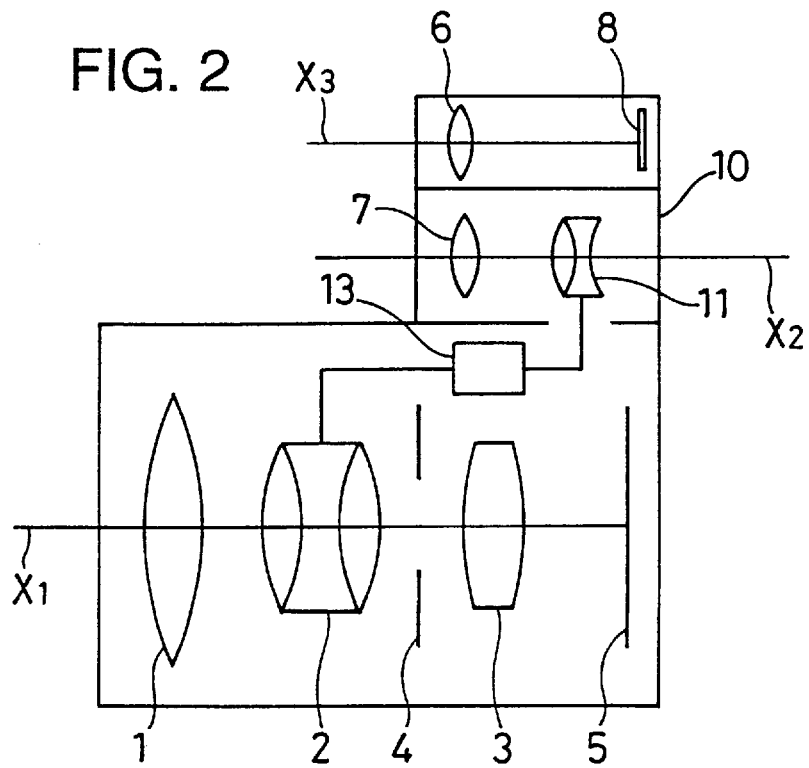
FIG. 2 is a diagram showing another construction of the camera of the first embodiment in which one image-blur correcting lens driving system is shared between the objective and view-finder optical systems.

As shown in FIG. 2, it is also possible to drive both of the image-blur correcting lens 2 of the taking optical system and the image-blur correcting lens 11 of the viewfinder optical system with a single image-blur correcting lens driving system 13. This helps reduce the size of the camera.

Figure 3:
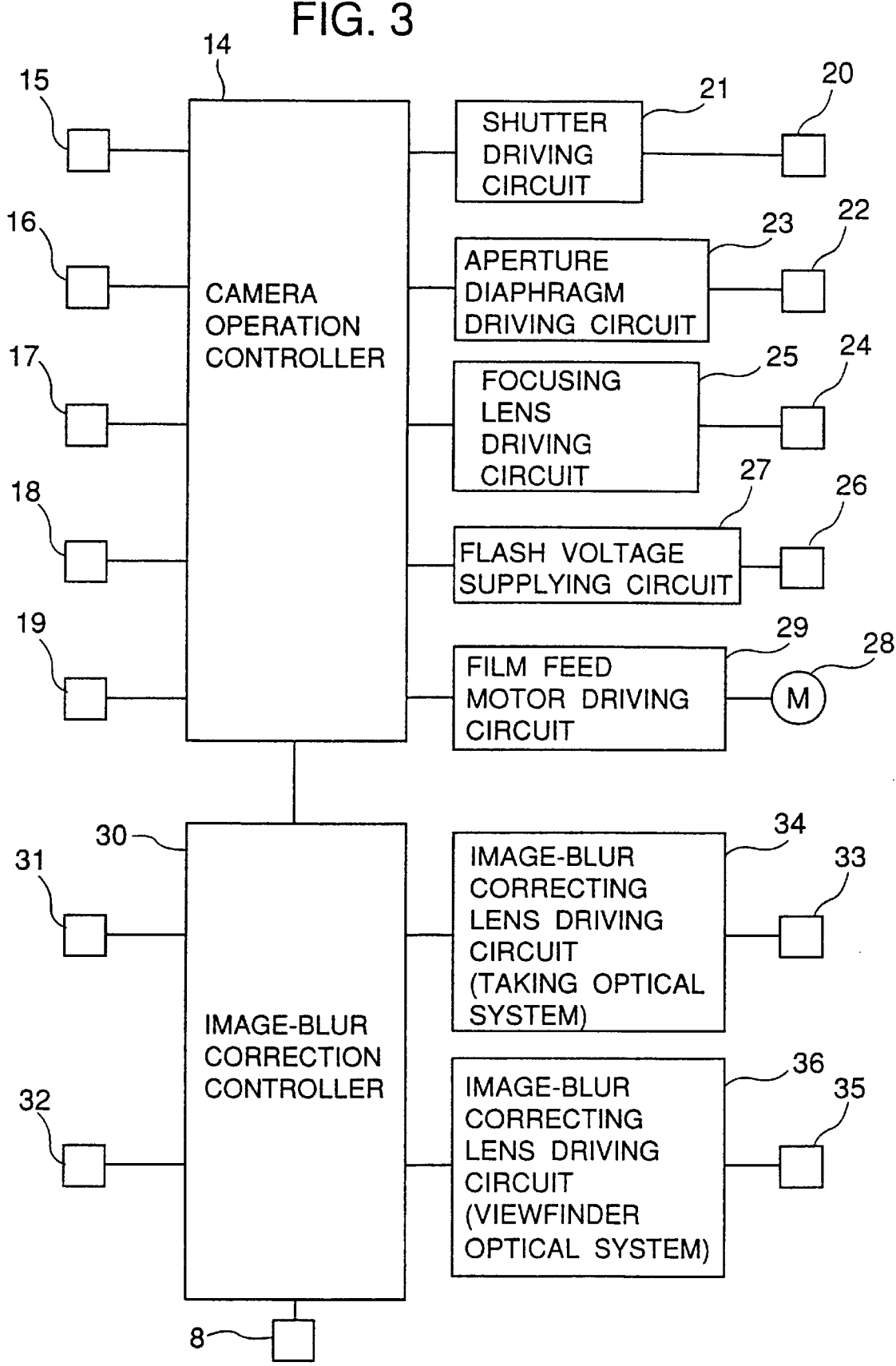
FIG. 3 is a diagram showing the construction of the control system used in the camera of the first embodiment.

FIG. 3 shows the construction of the control system used in the camera of the first embodiment. As shown in FIG. 3, the control system is formed around a camera operation controller 14 and an image-blur correction controller 30, which are each realized, for example, as a microcomputer and communicate with each other. The camera operation controller 14 communicates with a shutter button 15, a distance sensor 16, a photometric sensor 17, a camera inclination sensor 18, a focusing lens position sensor 19, a shutter 20, a shutter driving circuit 21, an aperture diaphragm 22, an aperture diaphragm driving circuit 23, a focusing lens actuator 24 for driving a focusing lens to achieve focus, a focusing lens driving circuit 25, a flash 26, a flash voltage supplying circuit 27, a film feed motor 28, and a film feed motor driving circuit 29.

The image-blur correction controller 30 communicates with an image-blur sensor 8, an image-blur correcting lens position sensor 31 for the taking optical system, an image-blur correcting lens position sensor 32 for the viewfinder optical system, an image-blur correcting lens actuator 33 for the taking optical system, an image-blur correcting lens driving circuit 34 for the taking optical system, an image-blur correcting lens actuator 35 for the viewfinder optical system, and an image-blur correcting lens driving circuit 36 for the viewfinder optical system.

The control system operates as follows. When the user presses the shutter button 15 halfway in, thereby bringing the. camera into a state hereinafter referred to as the S1 ON state, the camera operation controller 14, based on the output from the distance sensor 16, calculates either the distance from the object to the camera or the defocus condition. In addition, the camera operation controller 14, based on the object brightness information from the photometric sensor 17, calculates required amount of exposure.

On the other hand, the image-blur correction controller 30, based on the output from the image-blur sensor 8, calculates the amount of the image blur, and, in accordance with the calculated amount, controls the image-blur correcting lens driving circuit 36 for the viewfinder optical system to activate the image-blur correcting lens actuator 35 for the viewfinder optical system. While the image-blur correcting lens 11 for the viewfinder optical system is driven, its position is monitored by the image-blur correcting lens position sensor 32 for the viewfinder optical system. The output from this sensor 32 is used as feedback to achieve image-blur correction in the viewfinder optical system.

Next, when the user presses the shutter button 15 fully in, thereby bringing the camera into a state hereinafter referred to as the S2 ON state, the camera operation controller 14, in accordance with the already calculated object distance or defocus amount, controls the focusing lens driving circuit 25 to activate the focusing lens actuator 24. While the focusing lens is driven, its position is monitored by the focusing lens position sensor 19. The output from this sensor 19 is used as feedback to achieve proper focus in the taking optical system. On completion of focusing, the camera operation controller 14 instructs the image-blur correction controller 30 to correct the image blur in the taking optical system, and then, in accordance with the already calculated required amount of exposure, controls the aperture diaphragm driving circuit 23 and the shutter driving circuit 21 to activate the aperture diaphragm 22 and the shutter 20, respectively, thereby achieving exposure.

On the other hand, when the camera is brought into the S2 ON state, the image-blur correction controller 30 corrects the image blur in the taking optical system in accordance with the instruction from the camera operation controller 14. Specifically, even during exposure after the establishment of the S2 ON state, the image-blur correction controller 30 continues calculating the amount of the image blur based on the output from the image-blur detecting sensor 8, and, in accordance with the calculated image-blur amount, controls the image-blur correcting lens driving circuit 34 for the taking optical system to activate the image-blur correcting lens actuator 33 for the taking optical system. While the image-blur correcting lens 2 of the taking optical system is driven, its position is monitored by the image-blur correcting lens position sensor 31 for the taking optical system. The output from this sensor 31 is used as feedback to achieve image-blur correction in the taking optical system. Note that, at this time, image-blur correction in the viewfinder optical system may be executed simultaneously.

On completion of exposure, the above flow of operations is terminated. Thereafter, the film feed motor driving circuit 29 is controlled to drive the film feed motor 28 so that the film 5 is fed forward by one frame. The function of the camera inclination sensor 18, which affects the operation of the image-blur correcting lens actuators, will be described in detail later. The flow of operations followed when the flash 26 is fired will be described later. The differences between the image-blur correction operations during framing and those during shooting will be described in detail later.

Figure 4:
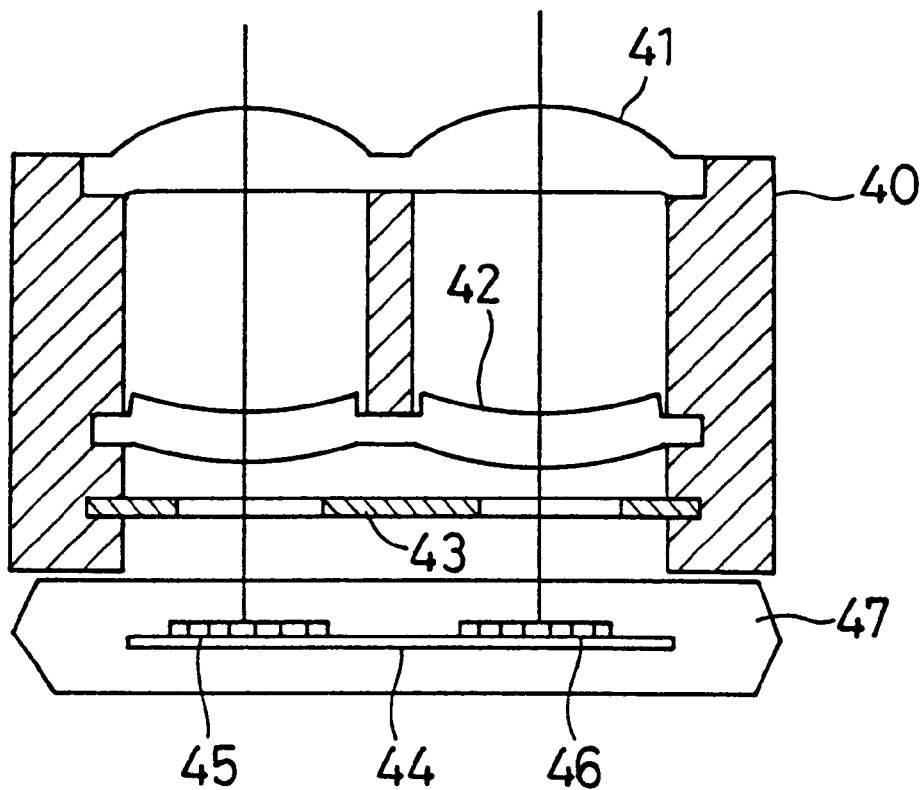
FIG. 4 is a vertical cross-sectional view of the image-blur sensor, schematically showing its optical system.

FIG. 4 is a vertical cross-sectional view of the image-blur sensor 8, schematically showing its optical system. In this example, the image-blur sensor 8 is designed to serve also as the distance sensor 16. The image-blur sensor 8 consists of the following components. A first lens array 41 is composed of two convex lenses combined side by side. A second lens array 42 is composed of two concave lenses combined side by side. These two lens arrays 41 and 42 serve to bring the object image in focus inside the sensor 8, while minimizing aberrations occurring around their respective optical axis. A light-shielding sheet 43 serves to intercept extra light that is undesirable for image-blur detection. The lens arrays 41 and 42 and the light-shielding sheet 43 are housed in a lens holder 40. A light-sensing device 44 is formed as a one-chip semiconductor device molded in a package 47, and serves to detect the light from the object by receiving it on its two light-receiving areas 45 and 46.

Figure 5:
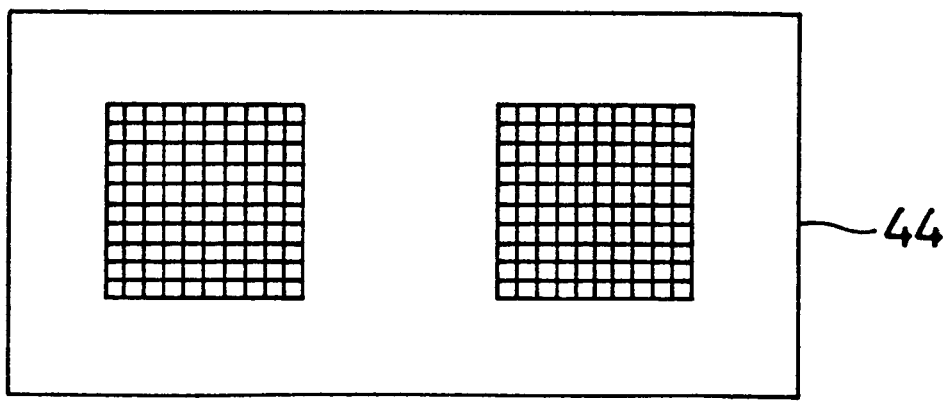
FIG. 5 is an enlarged view of the surface of the light-sensing device.
Figure 6:
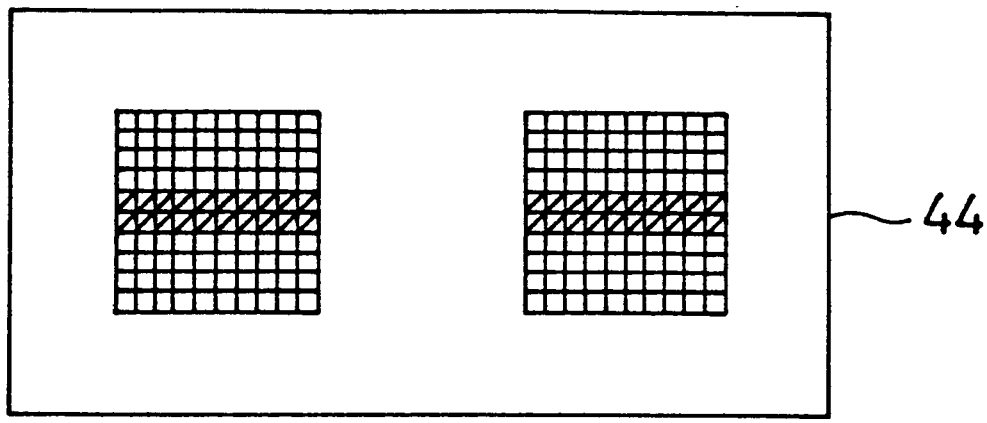
FIG. 6 is a diagram showing the light-receiving areas of the light-sensing device that are used for distance measurement.

FIG. 5 is an enlarged view of the surface of the light-sensing device 44 with its light-receiving areas. When the light-sensing device 44 is used for image-blur detection, only that one of its two light-receiving areas which yields an output indicating higher contrast in the object image is used. The flow of operations for image-blur detection will be described in detail later. When the light-sensing device 44 is used for distance measurement, only a strip-like portion within each of the light-receiving areas, as indicated by slant lines in FIG. 6, is used, and the light from the taking lens (in this case, the imaging lens 6 in FIG. 1) is evaluated separately in these two strip-like portions, that is, in right-hand and left-hand portions with respect to the optical axis, in accordance with the so-called phase-difference detection method. Specifically, two images formed separately on these two light-receiving areas are compared with each other to calculate the object distance. What portion of the object image is to be used for distance measurement can be changed easily by moving the strip-like portions upward or downward within the light-receiving areas.

FIGS. 7 to 14 show some examples of possible variations of the light-sensing device.

Figure 7:
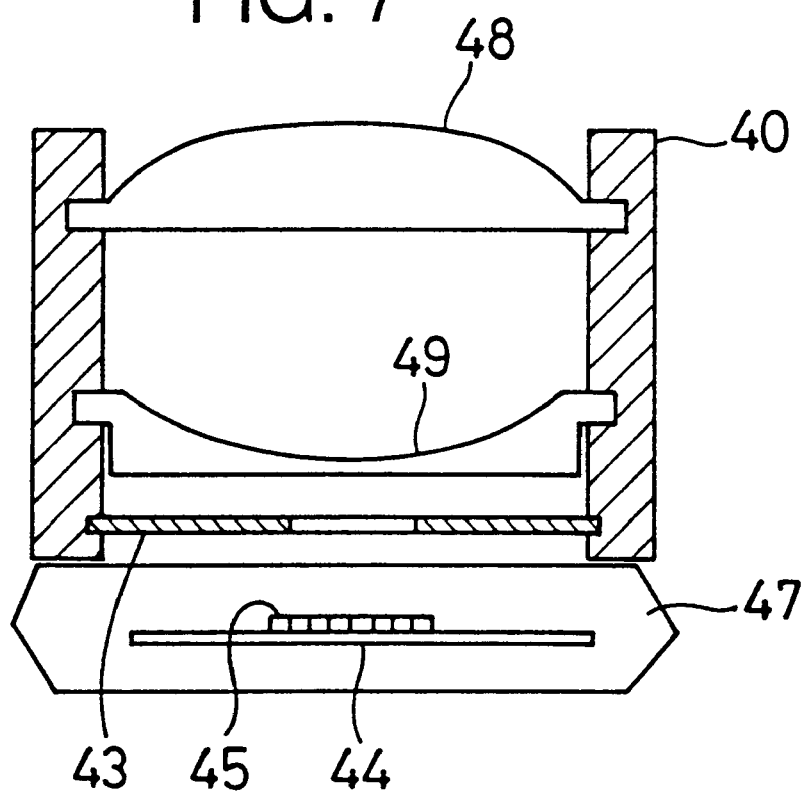
FIG. 7 is a diagram showing another type of the image-blur sensor that has only one optical axis.

As shown in FIG. 7, the image-blur sensor 8 may be of a type that has only one optical axis. This type of sensor uses a convex lens 48 and a concave lens 49 as its first and second lenses instead of lens arrays as used in the sensor shown in FIG. 4. Also with this type of sensor, the light-sensing device 44 can be used for distance measurement as well. In that case, the object distance is measured in accordance with the so-called contrast detecting method, which is based on the fact that the object image has maximum contrast when it is in focus.

Figure 8:
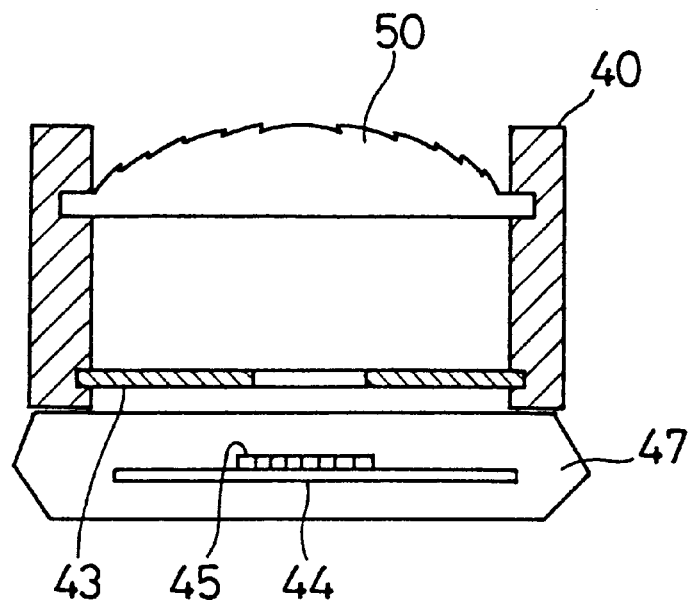
FIG. 8 is a diagram showing still another type of the image-blur sensor that employs a lens having a diffraction grating.

As shown in FIG. 8, the image-blur sensor 8 may be of a type that employs a lens having a diffraction grating 50. The use of the lens having a diffraction grating 50 offers improved aberration characteristics, and, by eliminating the need for a second lens, helps make the image-blur sensor 8 compact. The diffraction grating is designed to have decreasing pitches from its center out, within a range approximately from 80 to 200 $\mu$m.

Figure 9:
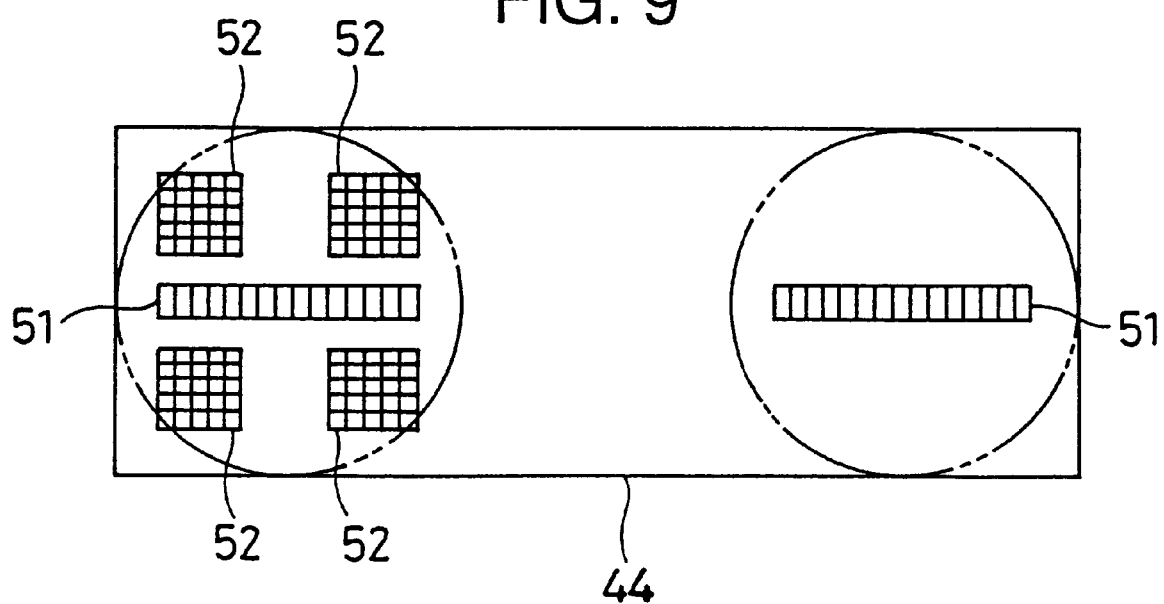
FIG. 9 is a diagram showing another construction of the light-sensing device in which the light-receiving areas of the image-blur sensor are arranged close to those of the distance sensor.

FIG. 9 shows another construction of the light-sensing device 44, in contrast to the construction shown in FIG. 5. Here, four light-receiving areas 52 of the image-blur sensor is arranged close to each of two light-receiving areas 51 of the distance sensor. This allows the two sensors to be formed on one chip, and thus makes it possible to add the image-blur sensor to a camera without extra cost or space. As indicated by dash-dot-dot lines in the figure, this construction requires two optical systems in the sensor. In this construction, subdivision of the light-receiving areas of the image-blur sensor reduces the number of picture elements contained in each light-receiving area, and thus reduces the time required to read each light-receiving area. As a result, image-blur correction can be processed more quickly. In this construction, however, since the distance sensor has a pair of light-receiving areas 51 arranged in fixed positions along a horizontal line, it is not possible to change vertically what portion of the object image is used for distance measurement.

Figure 10:
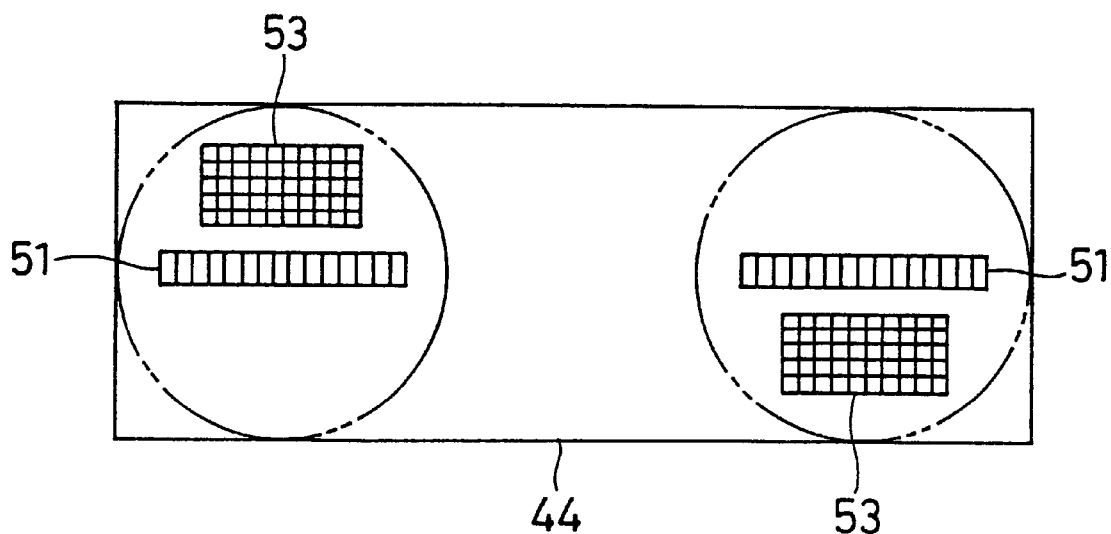
FIG. 10 is a diagram showing another construction of the light-sensing device in which the image-blur sensor has two light-receiving areas, one in its upper part and the other in its lower part, which are arranged separately in two optical systems of the sensor.
Figure 11:
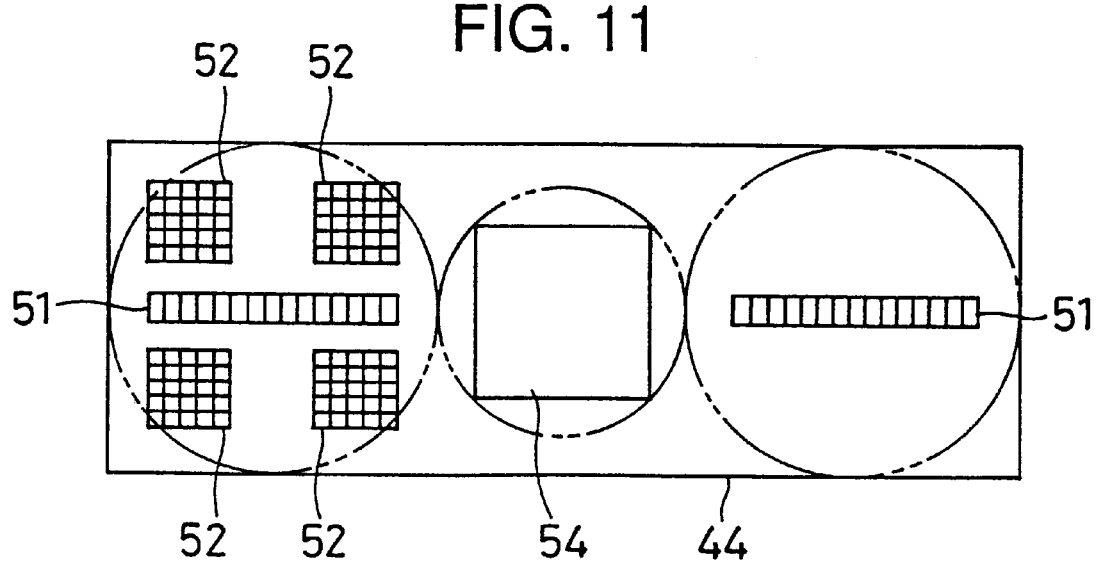
FIG. 11 is a diagram showing another construction of the light-sensing device in which, as compared with the construction shown in FIG. 9, a light-receiving area of the photometry sensor is additionally arranged between the light-receiving areas of the distance sensor.
Figure 12:
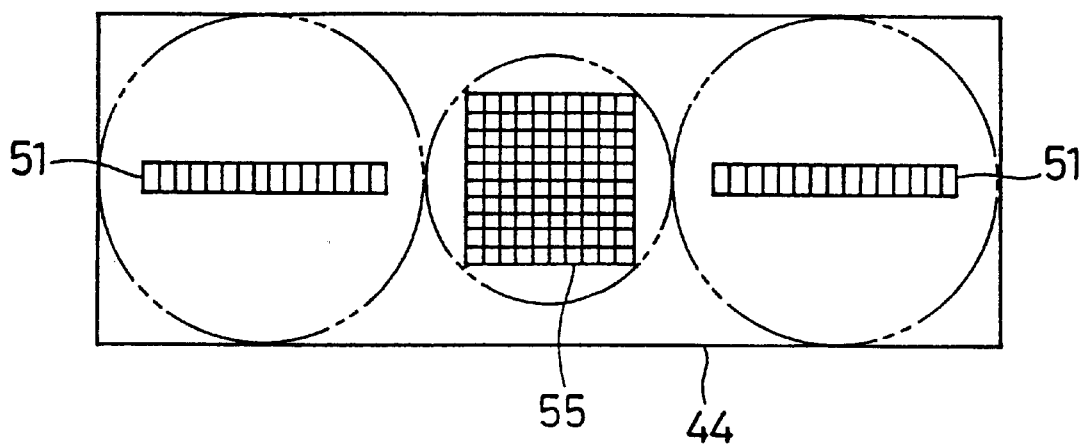
FIG. 12 is a diagram showing still another construction of the light-sensing device in which the photometry sensor and the image-blur sensor shares a common light-receiving area.

FIG. 10 shows another construction of the light-sensing device in which the image-blur sensor has two light-receiving areas 53, one in its upper part and the other in its lower part, which are arranged separately in two optical systems of the sensor. FIG. 11 shows another construction of the light-sensing device in which, as compared with the construction shown in FIG. 9, a light-receiving area 54 of the photometric sensor is additionally arranged between the light-receiving areas 51 of the distance sensor. As indicated by dash-dot-dot lines in the figure, this construction requires three optical systems in the sensor. FIG. 12 shows still another construction of the light-sensing device in which the photometric sensor and the image-blur sensor shares a common light-receiving area 55. As indicated by dash-dot-dot lines in the figure, this construction also requires three optical systems in the sensor.

Figure 13:
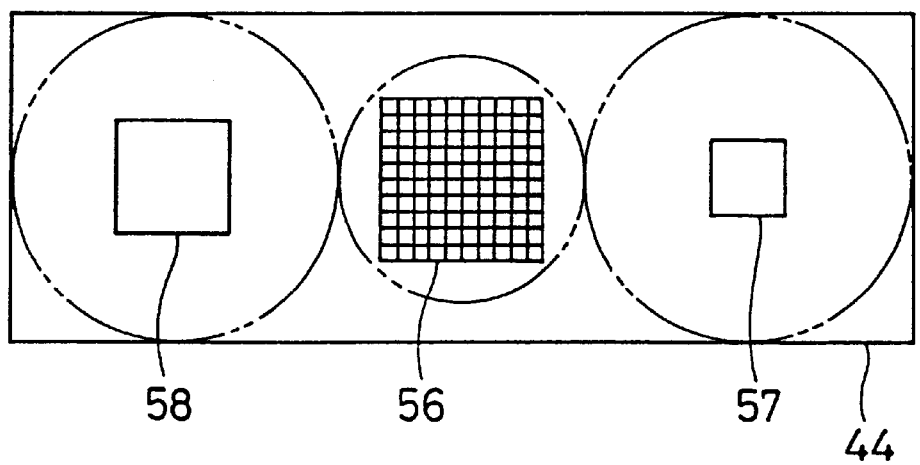
FIG. 13 shows a further construction of the light-sensing device in which the image-blur sensor is combined with a distance sensor using the infrared-beam active autofocus method.

Among various methods of distance measurement based on trigonometry, the so-called active autofocus method using an infrared beam calculates the object distance from the angle between an infrared beam emitted to the object and the beam returning therefrom. FIG. 13 shows a further construction of the light-sensing device in which the image-blur sensor is combined with a distance sensor that uses this method. This distance sensor has a light-emitter 57 such as an infrared light emitting diode, and a light-receiver 58 such as a phototransistor.

In general, in distance measurement based on the infrared-beam active autofocus method, the longer the distance between the light emitter 57 and the light-receiver 58, the higher accuracy is obtained. As a result, by arranging the light-receiving area 56 of the image-blur sensor in the spacious area thus secured between the light-emitter 57 and the light-receiver 58, it is possible to minimize idle space. As indicated by dash-dot-dot lines in FIG. 13, this construction requires three optical systems in the sensor.

FIG. 14 is a vertical cross-sectional view of a modified version of the camera of the first embodiment, schematically showing its construction in which a TTL-type image-blur detecting optical system is adopted. Here, a beam splitter 60 is used to split the light from the object, so that part of the light is directed to the image-blur sensor 8 for image-blur detection. Note that the viewfinder optical system is omitted in FIG. 14.

FIG. 15 shows another modified version of the camera of the first embodiment. Here, the light split for image-blur detection is first reflected by a mirror 61, is then passed through an imaging lens 62, and is then directed to the image-blur sensor 8. In this construction, by oscillating the image-blur sensor 8 in the direction indicated by arrow A by the use of a piezoelectric element 63, it is possible to determine the direction in which the image-blur sensor 8 needs to be moved to obtain higher contrast in the object image. This means that, in this construction, the image-blur sensor can be used also as a distance sensor using the contrast detecting method. This construction thus makes it possible to add the image-blur sensor to a camera without extra cost or space.

FIG. 16 is a front view of the camera of the first embodiment, schematically showing its appearance. On the front surface of the camera is provided an infrared assist beam emitter 64, which, when the object is in dim light, emits an infrared assist beam to achieve proper image-blur correction even in such a situation. This beam does not affect exposure, and accordingly it is not recorded on the film. Also provided on the front surface are a window 65 for the distance and image-blur sensors, a viewfinder 66, and a flash 67.

FIG. 17 is a side view of the camera of the first embodiment, showing how an image-blur correcting mechanism is incorporated into the camera. As shown in FIG. 17, of the lens units L1, L2, and L3 constituting the taking optical system, the second lens unit L2 is used as the image-blur correcting lens unit. Specifically, it is decentered in a direction perpendicular to a reference optical axis AX to cancel out an image blur resulting from a hand shake that may occur during shooting. The reference optical axis AX, which is used as a reference for the decentering of the image-blur correcting lens unit L2, is identical with the optical axis of the taking optical system, that is, it is the common optical axis of the lens units L1, L2, and L3 when no image-blur correction is made. Accordingly, decentering the image-blur correcting lens unit L2 in a direction perpendicular to the reference optical axis AX means decentering it such that its optical axis is kept parallel to the reference optical axis AX.

FIGS. 18A and 18B are diagrams showing the construction of the image-blur correcting mechanism incorporated into the camera of the first embodiment, with FIG. 18A illustrating mainly the portion related to image-blur correction and FIG. 18B illustrating mainly the portion related to focusing. FIG. 18A is a cross-sectional view taken along line B—B in FIG. 18B, and FIG. 18B is a cross-sectional view taken along line A—A in FIG. 18A. The construction and operation of this image-blur correcting mechanism will be described. The image-blur correcting lens unit L2 is held by a lens frame 71. When the image-blur correcting lens unit L2 is decentered, this lens frame 71 is driven by impact actuators Ax and Ay. The lens frame 71 is held, through the impact actuators Ax and Ay, by a support frame 72. When the taking optical system L1 to L3 is focused for the object, this support frame 72 is moved together with the lens frame 71 and the impact actuators Ax and Ay along the reference optical axis AX (i.e. in the z direction in FIG. 18B).

As shown in FIGS. 18A and 18B, the image-blur correcting mechanism is a unit composed of the lens frame 71, serving as a first holding member, and the support frame 72, serving as a second holding member, coupled together by the impact actuators Ax and Ay. Here, the impact actuators Ax and Ay supply mechanical power required to perform image-blur correction, that is, to drive the image-blur correcting lens unit L2 to be decentered in a direction perpendicular to the reference optical axis (i.e. within the x-y plane).

On the other hand, during focusing, another impact actuator Az, which is included in the focusing mechanism described later, supplies mechanical power required to perform focusing, that is, to drive the support frame 72 together with the entire image-blur correcting mechanism along the reference optical axis (i.e. in the z-direction). The above three impact actuators Ax, Ay, and Az are all realized with a piezoelectric linear actuator, which utilizes deformation of a piezoelectric element triggered by application of a voltage thereto. Specifically, driving members are fixed to piezoelectric elements, and members to be driven are friction-coupled with the driving members; then, by applying voltages to the piezoelectric elements such that they expand and contract with different speeds, the members to be driven can be moved. The principle of a piezoelectric linear actuator is disclosed, for example, in Japanese Laid-open Patent Application No. H4-69070, and accordingly no further details will be given in this respect.

As shown in FIGS. 18A and 18B, the image-blur correcting mechanism consists of, in addition to the lens frame 71 and the support frame 72, piezoelectric elements PEx and PEy, rods 74x and 74y, sliders 75x and 75y, and other components. As shown in FIGS. 19A and 19B, the lens frame 71 is formed as one unit together with joints 71a and 71b. As shown in FIG. 20, the distance between the joints 71a and 71b is set to be smaller than the diameter of the rods 74x and 74y. Accordingly, when the rods 74x and 74y are placed between the joints 71a and 71b, the former are pinched between the latter by the resilience of the latter, that is, the rods 74x and 74y are friction-coupled with the joints 71a and 71b. In this way, by pinching the two rods 74x and 74y, which are perpendicular to each other, between the joints 71a and 71b, the lens frame 71 is positioned in a plane perpendicular to the reference optical axis AX (i.e. the x-y plane).

On the other hand, as shown in FIG. 20, the sliders 75x and 75y have a C-shaped cross section, and their inner diameter is set to be smaller than the diameter of the rods 74x and 74y. Moreover, the rods 74x and 74y are made from a material harder than that of the sliders 75x and 75y. Accordingly, when the rods 74x and 74y are placed through the sliders 75x and 75y, the former are gripped inside the latter by the resilience of the latter. In this way, the sliders 75x and 75y are, by their own resilience, friction-coupled with the rods 74x and 74y so as to be slidable together with the latter along the axes of the latter.

Moreover, as shown in FIGS. 21A, 21B, and 21C, the support frame 72 is formed as one unit together with brackets 72ax and 72ay, supports 72bx and 72by, a joint 72c, and a guide 72d. The piezoelectric elements PEx and PEy have their one end surface firmly attached to the brackets 72ax and 72ay, as shown in FIG. 18A. The supports 72bx and 72by have holes 72bh, through which the rods 74x and 74y are slidably placed. The piezoelectric elements PEx and PEy have their other end surface (opposite to the one attached to the brackets 72ax and 72ay) firmly attached to one end of the rods 74x and 74y. When a voltage is applied to these piezoelectric elements PEx and PEy, they quickly deform, and thus oscillate the rods 74x and 74y in their length directions. As a result, the sliders 75x and 75y, which are friction-coupled with the rods 74x and 74y, move together with the latter along the axes of the latter.

Furthermore, between the side surfaces 71c and 71d of the joints 71a and 71b shown in FIGS. 19A to 19C, the sliders 75x and 75y are placed. Accordingly, when the sliders 75x and 75y are driven by the piezoelectric elements PEx and PEy, they push the side surfaces 71c and 71d, and thus move the lens frame 71. At this time, since the movement of the slider 75x causes the joints 71a and 71b pinching the rod 74y to slide in the same direction, the image-blur correction motion in the horizontal direction (i.e. in the x direction in FIG. 18) is not hampered. The same is true of the image-blur correction motion in the vertical direction (i.e. the y direction in FIGS. 18A and 18B).

As described above, the impact actuators Ax and Ay, which supply mechanical power required to perform image-blur correction, move the lens frame 71, which holds the image-blur correcting lens unit L2, within a plane perpendicular to the reference optical axis AX. In this way, the image-blur correcting lens unit L2 is decentered in a direction perpendicular to the reference optical axis AX. As the image-blur correcting lens unit L2 is decentered, the change in its position in the x and y directions is monitored by a combination of a pinhole plate, an LED (light-emitting diode, not shown), and a two-dimensional PSD (position sensing device) 70. A PSD is a device that senses position by recognizing at what position of it it is receiving a spot light.

The pinhole plate (not shown) is fixed to the lens frame 71, whereas the LED and the two-dimensional FSD 70, shown in FIG. 18A, are fixed to the support frame 72. The pinhole plate is arranged between the LED and the two-dimensional PSD 70, Accordingly, the PSD 70, by recognizing at what position it is receiving the light from the pinhole, knows the postilion of the pinhole plate, and thus the position of the lens frame 71. In this way, the position of the image-blur correcting lens unit L2 is monitored during decentering. Of course, it is also possible to fix the LED together with the pinhole plate to the lens frame 71, rather than to the support frame 72.

The construction and operation of the focusing Mechanism will be described. As shown in FIG. 18B, the focusing mechanism consists of, in addition to the support frame 72, a holding frame 73, a piezoelectric element PEz, a focusing rod 74z, and other components. As shown in FIGS. 17, 18A, and 182, the holding frame 73 holds the support frame 72 and a shutter unit (not shown). During zooming, or when the taking lens is put back into the body, the holding frame 73 moves along the reference optical axis AX.

An shown in FIG. 21B, the joint 72c formed on the support frame 72 has a hole 72ch whose diameter is smaller than the diameter of the focusing rod 74z. The focusing rod 74z is made of a material harder than that of the support frame 72. Accordingly, as shown in FIG. 18A, when the focusing rod 74z is placed through this hole 72ch, the former is gripped inside the latter by the resilience of the joint 72c. In this way, the support frame 72 is, by the resilience of its joint 72c, friction-coupled with the focusing rod 74z so as to be slidable together with the latter along the axis of the latter.

As shown in FIG. 18B, one end of the piezoelectric element PEz is firmly attached to the bottom surface 74za of a bottomed hole 74zh formed at one end of the focusing rod 74z, and the other end of the piezoelectric element PEz is firmly attached to the bottom surface 73a of a hole 73h formed in the holding frame 73. The focusing rod 74z is, at its end where the hole 74zh is formed, placed in the hole 73h of the holding frame 73 so as to be slidable along the reference optical axis AX. In order for the expanding and contracting movement of the piezoelectric element PEz to be transmitted properly to the focusing rod 74z, the depth of the hole 74zh is so designed that the focusing rod 74z, when placed in the hole 73h, leaves a gap between itself and the bottom surface 73a of the hole 73h. When a voltage is applied to the piezoelectric element PEz, it quickly deforms, and thus oscillates the focusing rod 74z in its length direction. As a result, the support frame 72, which is friction-coupled with the focusing rod 74z, moves together with the latter along the axis of the latter.

As described above, the impact actuator Az, which supplies mechanical power required to perform focusing, drives the support frame 72, and thus moves the image-blur correcting mechanism along the reference optical axis AX (in the z direction in FIG. 18B) to achieve focus. At this time, since the guide 72d (shown in FIG. 21B) formed on the support frame 72 is designed to slide along a focusing guide FG fixed to the holding frame 73, the support frame 72 does not move in a plane perpendicular to the reference optical axis AX.

In the above construction, the image-blur correcting lens unit L2 is used also for focusing, and thus focusing is performed by the use of the image-blur correcting lens unit L2 alone. However, it is also possible to perform focusing by moving the other lens units in accordance with the focusing movement of the image-blur correcting mechanism. Moreover, it is also possible to move the image-blur correcting mechanism along the reference optical axis AX during zooming by driving the support frame 72 with the impact actuator Az.

As the image-blur correcting mechanism moves for focusing, the image-blur correcting lens unit L2 moves in the z direction. This movement of the image-blur correcting lens unit L2 is monitored by the focusing rod 74z, which is magnetized, in combination with an MR (magnetic resistor) sensor 76 that is fixed to the support frame 72. The MR sensor 76 is a sensor having a magnetic resistor whose resistance varies with the strength of magnetism in which it is placed. Note that it is also possible to monitor the decentering movement of the image-blur correcting lens unit L2 by magnetizing the rods 74x and 74y and fitting MR sensors to the sliders 75x and 75y.

FIG. 22 is a diagram showing an example in which, instead of the piezoelectric element PEz, a motor M is used to supply mechanical power required to perform focusing. In this case, the support frame 72m has a threaded hole, which is thread-engaged with the threaded portion of a lead screw 74mz. The lead screw 74mz is rotatably fitted into the holding frame 73m. The motor M is, though not shown in the figure, mounted on the holding frame 73m. The power of the motor M is transmitted through a reduction gear (not shown) to the lead screw 74mz. Accordingly, when the lead screw 74mz is rotated by the motor M, the support frame 72 is fed in the direction of the axis of the lead screw 74mz. In this way, the image-blur correcting mechanism is moved along the reference optical axis AX (in the z direction) to perform focusing.

FIG. 23 is a diagram showing an example in which electromagnets and a coil are used to supply mechanical power required to perform image-blur correction and focusing. In this case, the holding frame (not shown) holds a coil 81 and four elastic rods 82a to 82d. During zooming, or when the taking lens is put back into the body, this holding frame moves along the reference optical axis AX. The elastic rods 82a to 82d are placed through the lens frame 83, which holds the lens unit L2, such that the elastic rods 82a to 82d are slidable together with the lens frame 83 along the optical axis of the lens unit L2. Though not shown, to the lens frame 83 is fixed a magnet that receives magnetic force acting along the reference optical axis AX from the coil 81 when focusing is performed. Note that, in practice, the elastic rods 82a to 82d, the lens frame 83, and others are placed inside the coil 81.

Although details are shown only for one of them in the figure, each of the elastic rods 82a to 82d has at its one end a piece of magnetic material 84 that is surrounded by four electromagnets 85a to 85d placed close thereto. For each of the elastic rods 82a to 82d, when the electromagnet 85a is turned on, it attracts the piece of magnetic material 84 in the x direction, and thus bends the elastic rods 82a to 82d accordingly. This causes the lens frame 83 to move in the x direction. In similar ways, by turning on the electromagnets 85a to 85d appropriately, the lens frame 83 can be moved freely within the x-y plane. Here, it is also possible to give the above mechanism a moving-coil type construction. In that case, the coil is fitted to the lens frame 83, and the magnet is held by the holding frame, so that, when focusing is performed, the coil receives magnetic force acting along the reference optical axis AX from the magnet.

FIG. 24 is a diagram showing how the two-dimensional PSD 70 in FIG. 18 is used in practice. As shown in FIG. 24, the pinhole plate 91 is placed between the LED 92 and the two-dimensional PSD 70. Accordingly, as the pinhole plate 91, together with its pinhole, moves, the resulting shift in the position at which the two-dimensional PSD 70 receives the light from the pinhole 91 is detected by the two-dimensional PSD 70. In this way, the position of a member fixed to the pinhole plate 91 can be monitored. Here, the LED 92 may be fixed to the pinhole plate 91 so that the two components form one unit.

FIG. 25 is a diagram schematically showing how the MR sensor 76 in FIG. 18 is used in practice. As shown in FIG. 25, as the MR sensor 76 moves along the length of a magnetized plate 93, which is magnetized to have alternating north-pole and south-pole regions, the MR sensor 76 detects the change in the state of the magnetic field around it. In this way, the position of a member fixed to the MR sensor 76 can be monitored. In the camera of the first embodiment, the PSD is used to monitor the movement of a member that is decentered for image-blur correction, and the MR sensor is used to monitor the movement of a member that is moved along the reference optical axis for focusing. However, many variations and modifications are possible as to how and where to use the PSD and the MR sensor.

FIG. 26 is a diagram schematically showing an example in which a photoreflector is used for position detection. In this case, as shown in FIG. 26, the light emitted from the photoreflector 94 is reflected from a pattern plate 95 back to the photoreflector 94. As the photoreflector 94 moves along the length of the pattern plate 95, it reads the pattern formed on the pattern plate 95. In this way, the position of a member fixed to the photoreflector 94 can be monitored.

FIG. 27 is a diagram schematically showing an example in which a photointerruptor is used for position detection. In this case, as shown in FIG. 27, the photointerruptor 96 has a gap across which light is passed. This light is alternately intercepted and allowed to pass by the blades of a blade wheel 97 that rotates with a member with which it is interlinked. Accordingly, as the blade wheel 97 rotates, the photointerruptor 96, by detecting the interception of the light, recognizes the number of revolutions the blade wheel has made. In this way, the position of the member with which the blade wheel 97 is interlinked can be monitored. How positioning of members is actually controlled by the use of the position detection methods described above will be discussed in detail later. Heretofore, the image-blur correcting mechanism for the taking optical system has been described. The image-blur correcting mechanism for the viewfinder optical system has basically the same construction. However, in the viewfinder optical system, since there is no need for a focusing mechanism, the impact actuators for decentering the image-blur correcting lens in a direction perpendicular to the optical axis are arranged on a support member (not shown) that supports the viewfinder optical system.

FIG. 28 is a flowchart showing the procedure followed by the camera operation controller 14 in FIG. 3 when shooting is performed. There are two image-blur correction modes: a first mode for use during framing, and a second mode for use during shooting. As shown in FIG. 28, when the power of the camera is turned on, the camera operation controller 14, in step #5, checks whether the camera is in the S1 ON state, that is, whether the shutter button 15 is in the half-pressed state, and, if so, proceeds to step #10. Then, the camera operation controller 14, in step #10, instructs the image-blur correction controller 30 to start the first image-blur correction mode, and, in step #15, performs photometry and calculates the required amount of exposure.

It is also possible to design the camera operation controller 14 to receive, at this time, information on the amount of the currently occurring image blur from the image-blur correction controller 30, so that, when the amount of the image blur is large, a program line that offers a faster shutter speed is selected.

Subsequently, in step #20, the camera operation controller 14 checks whether the camera is still in the S1 ON state, and, if so, proceeds to step #25. If the camera is no more in the S1 ON state, the camera operation controller 14 judges that the shutter button 15 has been released, and returns to the start of the procedure. In step #25, the camera operation controller 14 checks whether the camera is in the S2 ON state, that is, whether the shutter button 15 is in the fully-pressed state, and, if so, proceeds to step #30. In step #30, the camera operation controller 14 changes the image-blur correction mode from the first mode to the second mode, and then, in step #35, releases the shutter 20.

Subsequently, in step #40, the camera operation controller 14 checks whether it is time to fire the flash 26, and, if so, proceeds to #45; if not, it proceeds to step #60. In step #45, the camera operation controller 14 inhibits image-blur detection. This is to prevent erroneous detection of the amount of an image blur as may be caused by the noise due to emission of a flash. Then, in step #55, the camera operation controller 14 cancels the inhibition of image-blur detection.

In step #60, the camera operation controller 14 checks whether exposure is over, and, if so, proceeds to step #65; if not, it returns to step #40. Depending on the shooting conditions, there is no need for flash emission; in that case, the operations in steps #45, #50, and #55 above are skipped. Thereafter, the camera operation controller 14 closes the shutter 20 in step #65, ends operations for image-blur correction in step #70, feeds the film in step #75, and then returns to the start of the procedure.

FIG. 29 is a flowchart showing the procedure followed by the image-blur correction controller 30 in FIG. 3 when image-blur correction is performed. As shown in FIG. 29, the image-blur correction controller 30, in step S5, checks whether the camera operation controller 14 has requested starting of image-blur correction, and, if so, proceeds to step S10. In step S10, in order to obtain an object image for image-blur detection, the image-blur correction controller 30 performs image processing such as CCD integration in accordance with the information from the image-blur sensor 8. Then, in step S15, the obtained image is divided into blocks, and the block having the highest contrast among them is selected as a reference block for use as a reference for the calculation of the amount of an image blur.

Subsequently, a predetermined time period after, the image-blur correction controller 30 performs image processing again in step S20, and then, in step S25, checks whether image-blur detection is inhibited; if not, it proceeds to step S65. In step S65, from within a wider area including the reference block as its-center, the block having the highest correlation with the reference block is selected as a target block (this block is used as the reference block the next time image processing is performed), and the distance between the target block and the reference block is calculated. This distance is taken as the amount of the image blur. Then, in step S75, the image-blur correction controller 30 checks whether the amount of the image blur is smaller than a predetermined level, and, if so, proceeds to step S35 to perform image-blur correction.

If, in step S25, image-blur detection is inhibited, the image-blur correction controller 30 proceeds to step S30, where the previously calculated image-blur amount is taken as the current image-blur amount. Since these image-blur correction operations are repeated very quickly, it never happens that image-blur detection is inhibited prior to the starting of image-blur correction, and that, as a result, no previous data is available.

In step S35, the image-blur correction controller 30 detects the current position of the image-blur correcting lenses, and then, in step S40, it checks whether the camera is in the first image-blur correction mode. If so, the image-blur correction controller 30 proceeds to step S45 to calculate the image-blur correction amount (the amount by which the image-blur correcting lenses are moved) and the driving speed appropriate for the first mode; if not, that is, if the camera is in the second image-blur correction mode, the image-blur correction controller 30 proceeds to step S60 to calculate the image-blur correction amount and the driving speed appropriate for the second mode.

If, in step S75, the amount of the image blur is equal to or greater than the predetermined level, the image-blur correction controller 30 judges that the motion of the camera results not from a hand shake, but from intentional "panning" for the change of picture composition, and proceeds to step S80. In step S80, the image-blur correction controller 30 detects the position of the image-blur correcting lenses, and then, in step S85, concludes that the image-blur lenses need to be moved up to the center of the optical system at a predetermined speed. Here, instead of detecting the amount of the image blur, it is also possible to detect slower, lower-frequency movement of the camera characteristic of panning in order to distinguish panning from hand shakes.

Subsequently, in step S50, the image-blur correction controller 30 drives the image-blur correcting lenses in accordance with the values calculated or determined in the operations heretofore. At this time, when the camera is in the first image-blur correction mode, image-blur correction is performed only in the viewfinder optical system, and, when the camera is in the second image-blur correction mode, image-blur correction is performed only in the taking optical system. In this way, it is possible to reduce the electric power consumed in image-blur correction. Thereafter, in step S55, the image-blur correction controller 30 checks whether image-blur correction is still requested, and, if so, it returns to step S20 to repeat the image-blur correction operations. If image-blur correction is no more requested, that is, if termination of image-blur correction is requested, the image-blur correction controller 30 returns to the start of the procedure.

Figure 30A:
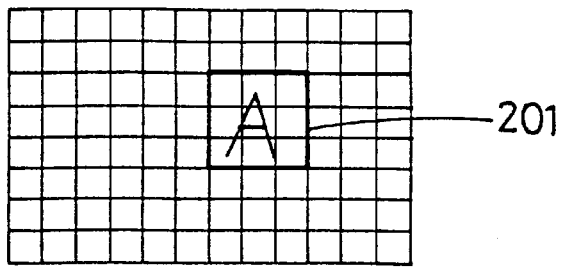
Figure 30B:
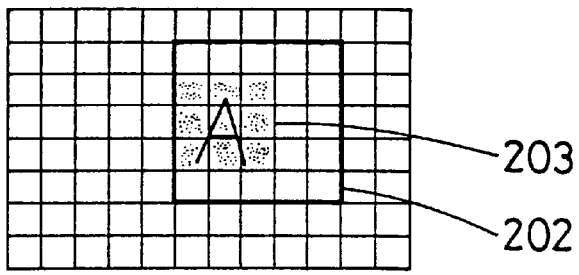

FIGS. 30A to 30D shows the sequence of image-blur detection. In FIGS. 30A to 30D, each rectangle with a grating pattern inside represents the light-receiving area of the image-blur sensor 8. First, in order to obtain an object image for image-blur detection, image processing such as CCD integration is performed in accordance with the information from the image-blur sensor 8. Then, as shown in FIG. 30A, the obtained image is divided into blocks, and the block having the highest contrast among them is selected as a reference block 201 for use as a reference for the calculation of the amount of an image blur. After a predetermined time period, as shown in FIG. 30B, from within a wider area 202 including the reference block 201 as its center, the block having the highest correlation with the reference block 201 is selected as a target block 203, and the distance between the target block 203 and the reference block 201 is calculated. This distance is taken as the amount of the image blur, and image-blur correction is performed on the basis of this amount.

Figure 30C:
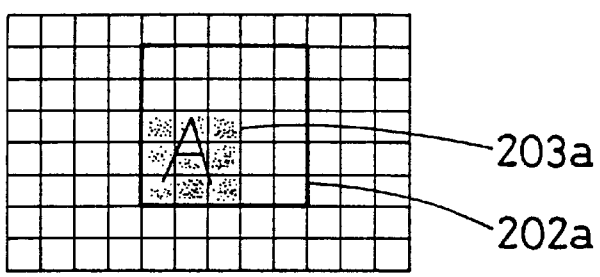

Then, after a predetermined time period, as shown in FIG. 30C, from within a wider area 202a including the block 203 as its center, the block having the highest correlation with the block 203 is selected as a target block 203a, and the distance between the target block 203a and the block 203 is calculated. This distance is taken as the amount of the image blur, and image-blur correction is performed on the basis of this amount.

Figure 30D:
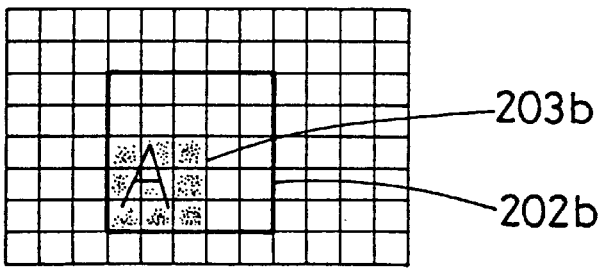

Then, after a predetermined time period, as shown in FIG. 30D, from within a wider area 202b including the block 203a as its center, the block having the highest correlation with the block 203a is selected as a target block 203b, and the distance between the target block 203b and the block 203a is calculated. This distance is taken as the amount of the image blur, and image-blur correction is performed on the basis of this amount. This sequence is repeated until exposure is terminated.

As described earlier, the position of the image-blur correcting lenses and the position of the focusing lens can be detected, for example, by the use of the MR sensor 76 in combination with the magnetized plate 93, as shown in FIG. 25. However, it is technically difficult to obtain sufficiently high resolution by this method at reasonable cost. Accordingly, as shown in FIG. 31, it is customary to interpolate the readings of the MR sensor 76 for higher resolution. Specifically, since the position of the MR sensor 76 relative to the magnetized plate 93 is read out as a resistance that is represented by two sine curves having a phase difference of 90°, the readings of the MR sensor 76 can be readily interpolated by comparing these two sine curves. As the result of interpolation, as shown in FIG. 31, although the interval between adjacent opposite magnetic poles formed on the magnetized plate 93 is 80 $\mu$m, it is possible to obtain a resolution of 20 $\mu$m.

However, the positioning of the image-blur correcting lenses needs to be performed with still higher accuracy, and at reasonable cost. To achieve this, it is necessary to use, in addition to closed-loop control as described above, open-loop control as well. Now, assume that the MR sensor 76 has a resolution of 80 $\mu$m, as shown at (a) of FIG. 32, and that interpolation of its readings provides a resolution of 20 $\mu$m, as shown at (b) of FIG. 32. Further, assume that an image-blur correcting lens is now about to be moved by a distance of 115 $\mu$m from the current position. In this case, of the total distance of 115 $\mu$m, the closed-loop control is responsible for the distance of 100 $\mu$m, which is a whole-number (five, in this case) multiple of 20 $\mu$m, and the open-loop control is responsible for the remaining distance of 15 $\mu$m. More specifically, the positioning of the image-blur correcting lenses is performed through the following procedure.

FIG. 33 shows the procedure performed by the image-blur correction controller 30 in FIG. 3 to drive the image-blur correcting lenses. As shown in FIG. 33, when driving of the image-blur correcting lenses is requested, the image-blur correction controller 30, in step *5, calculates the distance from the current position to the target position to determine the total driving distance. Further, in step *10, it calculates the driving distance to be taken care of by the closed-loop control, and, in step *15, calculates the driving distance to be taken care of by the open-loop control. Then, in step *20, the closed-loop control is activated. Subsequently, in step *25, the image-blur correction controller 30 checks whether the closed-loop control has completed driving up to the end, so that, if so, it proceeds to step *30, and, if not, it returns to step *20.

In step *30, the image-blur correction controller 30 calculates the number of driving pulses to be fed to the actuators for the open-loop control, and then, in step *35, it outputs the pulses required for the open-loop control. Subsequently, in step *40, the image-blur correction controller 30 checks whether output of the pulses required for the open-loop control is complete, so that, if so, it terminates the driving of the image-blur correcting lenses, and, if not, it returns to step *35. Note that this procedure is applicable not only to cases where the MR sensor 76 is used, but also to cases where the photoreflector 94 shown in FIG. 26, the photointerruptor 96 shown in FIG. 27, or other type of sensor is used. Note that, although the open-loop control is described above as being based on a pulse count, it can also be performed based on a driving time.

When impact actuators are used to drive the image-blur correcting lenses as shown in FIG. 18, it is important to grasp the number of pulses (hereinafter referred to as the K-value) required to be fed to the impact actuators to move the image-blur correcting lenses by a unit distance. For example, if feeding 1.5 pulses results in movement of 1 $\mu$m, the K-value is said to be K=1.5, implying that feeding 15 pulses theoretically results in movement of 10 $\mu$m. However, the impact actuators are affected by gravity differently depending on the position they are taking at a particular moment and on the direction in which they exert force, that is, the K-value varies for different driving directions. Accordingly, it is essential to know beforehand the K-value for each driving direction. To achieve this, actual K-values are measured, and stored, in the form of a data table as shown in FIG. 34, in an EEPROM (electrically erasable/ programmable read-only memory).

During shooting, the K-values are read out from the EEPROM, and are further corrected with the information on inclination from the camera inclination sensor 18 in FIG. 3, so that the image-blur correcting lenses are driven with the number of pulses most appropriate for a particular situation. Alternatively, instead of using K-values measured and stored beforehand, it is also possible to calculate them during the closed-loop control, immediately before the open-loop control is activated, by detecting at that time the correlation between the driving distance and the number of pulses, so that the image-blur correcting lenses are driven in accordance with the thus calculated K-values. The procedure for this is as follows.

FIG. 35 shows the procedure performed by the image-blur correction controller 30 in FIG. 3 to drive the image-blur correcting lenses by calculating K-values during the closed-loop control. As shown in FIG. 35, when driving of the image-blur correcting lenses is requested, the image-blur correction controller 30, in step P5, calculates the distance from the current position to the target position to determine the total driving distance. Further, in step P10, it calculates the driving distance to be taken care of by the closed-loop control, and, in step P15, calculates the driving distance to be taken care of by the open-loop control. Then, in step P20, the closed-loop control is activated. Subsequently, in step P25, the image-blur correction controller 30 checks whether the closed-loop control has completed driving up to one step (corresponding to the resolution of the MR sensor after interpolation in FIG. 32, i.e. 20 $\mu$m) short of the distance to be covered by it (that is, whether it has completed driving up to 80 $\mu$m from the original position), so that, if so, the image-blur correction controller 30 proceeds to step P30, and, if not, it returns to step P20.

In step P30, the image-blur correction controller 30 starts counting the driving pulses, and then, in step P35, lets the closed-loop control complete driving for the remaining one step. Thereafter, in step P40, the image-blur correction controller 30 checks whether the closed-loop control has completed driving up to the end, so that, if so, it proceeds to step P45, and, if not, returns to P35. Then, the image-blur correction controller 30 ends the counting of the driving pulses in step P45, calculates the K-values in step P50, and proceeds to step P55.

In step P55, the image-blur correction controller 30 calculates the number of driving pulses to be fed to the actuators for the open-loop control, and then, in step P60, it outputs the pulses required for the open-loop control. Subsequently, in step P65, the image-blur correction controller 30 checks whether output of the pulses required for the open-loop control is complete, so that, if so, it terminates the driving of the image-blur correcting lenses, and, if not, it returns to step P60. In this way, by calculating the K-values in accordance with the relation between the number of pulses and the driving distance immediately before the open-loop control is started, it is possible to drive the image-blur correcting lenses with higher accuracy.

Now, let the amount of an image blur as calculated by the image-blur detecting system be $\Delta x$, and let the amount of decentering by which the image-blur correcting lens needs to be driven to perfectly correct the image blur as observed on the film surface be $\Delta L0$. Then, the formula $\Delta L0 = k0 \cdot \Delta x$ holds. This formula defines a condition to be satisfied to achieve proper image-blur correction during shooting. Here, k0 is a correction factor, which is a constant representing the ratio of the amount of the image blur to the amount of decentering of the image-blur correcting lens. However, if the same formula is strictly followed in image-blur correction during framing, the viewfinder image exactly follows the motion of the camera due to a hand shake, which the user rather feels to be overcorrection.

To alleviate this apparent overcorrection, for image-blur correction during framing, the image-blur correcting lens is driven by calculating its decentering amount as $\Delta L1 = \{(\beta-1)/\beta\} \cdot k0 \cdot \Delta x = k1 \cdot \Delta x$. Here, $\beta$ represents the viewfinder magnification (the ratio of the size of the object as observed in the viewfinder to its size as observed directly with the naked eye), and k1 represents a correction factor for image-blur correction during framing.

In a single-lens reflex camera, the viewfinder magnification $\beta$ varies with the focal length F1 of the interchangeable taking lens, and therefore it can be expressed as $\beta = F1 \cdot \beta 0$. Here, $\beta 0$ is a predetermined value specific to the viewfinder housed in the camera body, and is approximately equal to the reciprocal of the focal length of the viewfinder optical system. Accordingly, in a single-lens reflex camera, the correction factor for image-blur correction during framing is defined as $k1 = \{(F1 \cdot \beta 0 - 1)/F1 \cdot \beta 0\} \cdot k0$.

FIG. 36 shows an example of the construction of the taking optical system when the camera of the first embodiment is implemented as a lens shutter camera. Here, the taking optical system includes, as its essential component, a three-unit eight-element zoom lens system. This taking optical system performs focusing by moving its second lens unit Gr2 along the optical axis, and performs image-blur correction by decentering the same lens unit Gr2 in a direction perpendicular to the optical axis. In this case, addition of the image-blur correcting function causes only a negligible increase in the camera size. In FIG. 36, numeral 204 represents an aperture diaphragm. FIGS. 37A and 37B show an example of the construction of the taking optical system when the camera of the first embodiment is implemented as a single-lens reflex camera, with FIG. 37A illustrating its wide-angle end condition and FIG. 37B illustrating its telephoto end condition. This taking optical system performs focusing by the use of its first lens unit Gr1, and performs image-blur correction by decentering part of its second lens unit Gr2 (the lens elements hatched in the figure) in a direction perpendicular to the optical axis.

FIG. 38 is a vertical cross-sectional view of a camera having an image-blur correcting function as a second embodiment of the present invention, schematically showing its basic construction. As shown in FIG. 38, the camera includes lens units 101, 102, 103, and 104 constituting a taking optical system, an aperture diaphragm 105, a shutter 106, a film 107, an image-blur sensor 108, an image-blur correcting lens driving system 109 for the taking optical system, a pellicle mirror 110, a beam splitter 111, an imaging lens 112, a viewfinder lens 113, and a viewfinder 114. In this embodiment, the lens unit 103 is used as an image-blur correcting lens.

During shooting, that is, when a shot is taken by exposing the film 107 to the light from the object, an image blur is corrected as follows. The light from the object enters the taking optical system, where the light is passed through the lens units 101 to 103 and through the aperture diaphragms 105, is reflected by the pellicle mirror 110, is passed through the imaging lens 112, and is then received by the image-blur sensor 108 that is realized with a photoelectric conversion device such as a CCD (charge-coupled device). When a hand shake occurs, this sensor 108 detects the resulting image blur. Then, in accordance with the amount and direction of the detected image blur, the image-blur correcting lens driving system 109 drives the image-blur correcting lens 103 to be decentered in a direction perpendicular to the optical axis X1 of the taking optical system in such a way that the image blur is canceled out. As a result, the image of the object is kept in the same position on the film 107 throughout exposure.

During framing, that is, when the object is viewed through the viewfinder 114 in order to set the shooting range and picture composition, the light from the object, after being reflected by the pellicle mirror 110 and passed through the imaging lens 112, is further reflected by the beam spitter 111 and passed through the viewfinder lens 113, so that the object image is formed in the viewfinder 114.

As shown in FIG. 39, it is also possible to arrange the pellicle mirror 110 immediately in front of the shutter 106, so that the light for image-blur detection and for framing is extracted at this position. This arrangement eliminates the need for the imaging lens 112, and is typically adopted in single-lens reflex cameras.

As shown in FIG. 40, it is also possible to perform image-blur correction separately in the taking optical system and in the viewfinder optical system. In FIG. 40, numeral 105a represents an aperture diaphragm/shutter unit, numeral 109a represents an image-blur correcting lens driving system for both of the taking and viewfinder optical systems, and numeral 100 represents an image-blur correcting lens for the viewfinder optical system. This image-blur correcting lens driving system 109a is capable of driving the image-blur correcting lens 103 in the taking optical system and the image-blur correcting lens 115 in the viewfinder optical system either independently or simultaneously. This makes it possible, for example, to concentrate electric power on the image-blur correcting lens 103 to drive this lens alone during telephoto shooting when the amount of image-blur correction movement tends to be large, and to drive both of the image-blur correcting lenses 103 and 115 during wide-angle shooting when the amount of image-blur correction movement tends to be small.

Moreover, by driving only the image-blur correcting lens 103 in the taking optical system during shooting, and by driving only the image-blur correcting lens 115 in the viewfinder optical system during framing, it is possible to reduce total electric power consumed in image-blur correction.

FIG. 41 shows the construction of the control system used in the camera of the second embodiment. As shown in FIG. 41, the control system is formed around a camera operation controller 114 and an image-blur correction controller 130, which are each realized, for example, as a microcomputer and communicate with each other. The camera operation controller 114 communicates with a shutter button 115, a distance sensor 116, a photometric sensor 117, a focusing lens position sensor 119, a shutter 120, a shutter driving circuit 121, an aperture diaphragm 122, an aperture diaphragm driving circuit 123, a focusing lens actuator 124 for driving a focusing lens to achieve focus, a focusing lens driving circuit 125, a flash 126, a flash voltage supplying circuit 127, a film feed motor 128, and a film feed motor driving circuit 129.

The image-blur correction controller 130 communicates with an image-blur sensor 108, an image-blur correcting lens position sensor 131 for the taking optical system, an image-blur correcting lens position sensor 132 for the viewfinder optical system, an image-blur correcting lens actuator 133 for the taking optical system, an image-blur correcting lens driving circuit 134 for the taking optical system, an image-blur correcting lens actuator 135 for the viewfinder optical system, and an image-blur correcting lens driving circuit 136 for the viewfinder optical system.

The control system operates as follows. When the user presses the shutter button 115 halfway in, thereby bringing the camera into the S1 ON state, the camera operation controller 114, based on the output from the distance sensor 116, calculates either the distance from the object to the camera or the defocus condition. In addition, the camera operation controller 114, based on the object brightness information from the photometric sensor 117, calculates required amount of exposure.

On the other hand, the image-blur correction controller 130, based on the output from the image-blur sensor 108, calculates the amount of the image blur, and, in accordance with the calculated amount, controls the image-blur correcting lens driving circuit 136 for the viewfinder optical system to activate the image-blur correcting lens actuator 135 for the viewfinder optical system. While the image-blur correcting lens 111 for the viewfinder optical system is driven, its position is monitored by the image-blur correcting lens position sensor 132 for the viewfinder optical system. The output from this sensor 132 is used as feedback to achieve image-blur correction in the viewfinder optical system.

Next, when the user presses the shutter button 115 fully in, thereby bringing the camera into the S2 ON state, the camera operation controller 114, in accordance with the already calculated object distance or amount of defocus, controls the focusing lens driving circuit 125 to activate the focusing lens actuator 124. While the focusing lens is driven, its position is monitored by the focusing lens position sensor 119. The output from this sensor 119 is used as feedback to achieve proper focus in the taking optical system. On completion of focusing, the camera operation controller 114 instructs the image-blur correction controller 130 to correct the image blur in the taking optical system, and then, in accordance with the already calculated required amount of exposure, controls the aperture diaphragm driving circuit 123 and the shutter driving circuit 121 to activate the aperture diaphragm 122 and the shutter 120, respectively, thereby achieving exposure.

On the other hand, when the camera is brought into the S2 ON state, the image-blur correction controller 130 corrects the image blur in the taking optical system in accordance with the instruction from the camera operation controller 114. Specifically, even during exposure after the establishment of the S2 ON state, the image-blur correction controller 130 continues calculating the amount of the image blur based on the output from the image-blur detecting sensor 108, and, in accordance with the calculated image-blur amount, controls the image-blur correcting lens driving circuit 134 for the taking optical system to activate the image-blur correcting lens actuator 133 for the taking optical system. While the image-blur correcting lens 103 of the taking optical system is driven, its position is monitored by the image-blur correcting lens position sensor 131 for the taking optical system. The output from this sensor 131 is used as feedback to achieve image-blur correction in the taking optical system. Note that, at this time, image-blur correction in the viewfinder optical system may be executed simultaneously.

On completion of exposure, the above flow of operations is terminated. Thereafter, the film feed motor driving circuit 129 is controlled to drive the film feed motor 128 so that the film 105 is fed forward by one frame.

In other respects, the camera of the second embodiment is constructed and controlled in the same way as that of the first embodiment.

FIGS. 42A and 42B show an example of the construction of the taking optical system when the camera of the second embodiment is implemented as a single-lens reflex camera. Here, the taking optical system includes, as its essential component, a four-unit zoom lens system. This taking optical system performs focusing by moving its second lens unit Gr2 as a whole along the optical axis, and performs image-blur correction by decentering part of the second lens unit Gr2 (the lens elements hatched in the figure) in a direction perpendicular to the optical axis. FIG. 42A illustrates the taking optical system in the wide-angle end condition, and FIG. 42B illustrates it in the telephoto end condition. It is also possible to use the taking optical system shown in FIG. 37, which has been described in connection with the first embodiment, in implementing the camera of the second embodiment as a single-lens reflex camera.

What is claimed is:

1. A camera comprising:

a taking optical system;

a viewfinder optical system;

a first compensation optical system disposed in the taking optical system so as to compensate for an image blur resulting from vibration of the camera;

a second compensation optical system disposed in the viewfinder optical system so as to compensate for an image blur resulting from vibration of the camera; and a controller for controlling image blur compensation in such a way that, when no recording of an image is being performed through the taking optical system, an image blur is compensated for by the second compensation optical system alone and, when recording of an image is being performed through the taking optical system, an image blur is compensated for by the first compensation optical system alone.

2. A camera as claimed in claim 1, wherein the first and second compensation optical systems compensate for an image blur in different manners.

3. A camera as claimed in claim 2, wherein the first and second compensation optical systems compensate for an image blur by being driven by different drive amounts.

4. A camera as claimed in claim 2, wherein the first and second compensation optical systems compensate for an image blur by being driven at different drive speeds.

5. A camera comprising:

an image-taking section for recording an image of a subject;

a viewfinder section for observing the image of the subject;

a first compensator for compensating for an image blur that occurs in the image-taking section as a result of vibration of the camera;

a second compensator for compensating for an image blur that occurs in the viewfinder section as a result of vibration of the camera; and a controller for controlling image blur compensation in such a way that, when no recording of an image by the image-taking section is being required, an image blur is compensated for by the second compensator alone and, when recording of an image by the image-taking section is being requested, an image blur is compensated for by the first compensator alone.

6. A camera as claimed in claim 5, wherein the first and second compensators compensate for an image blur in different manners.

7. A camera as claimed in claim 6, wherein the first and second compensators compensate for an image blur by compensating for the image blur by different compensation amounts.

8. A camera as claimed in claim 6, wherein the first and second compensators compensate for an image blur by compensating for the image blur at different compensation speeds.

9. A camera comprising:

a recording section for recording an image of a subject;

a viewfinder section for observing the image of the subject; and a compensator that, when recording of an image by the recording section is being requested, compensates only for an image blur occurring in an image to be recorded by the recording section as a result of vibration of the camera and that, when no recording of an image by the recording section is being requested, compensates only for an image blur occurring in an image to be observed through the viewfinder section as a result of vibration of the camera.

10. A camera as claimed in claim 9, wherein an image blur is compensated for in different manners in the recording section and in the viewfinder section.

11. A camera as claimed in claim 10, wherein an image blur is compensated for by different compensation amounts in the recording section and in the viewfinder section.

12. A camera as claimed in claim 10, wherein an image blur is compensated for at different compensation speeds in the recording section and in the viewfinder section.

* * * * *